(12) United States Patent
Eliaz et al.

(10) Patent No.: US 8,831,124 B2
(45) Date of Patent: Sep. 9, 2014

(54) MULTI-MODE ORTHOGONAL FREQUENCY DIVISION MULTIPLEXING TRANSMITTER FOR HIGHLY-SPECTRALLY-EFFICIENT COMMUNICATIONS

(71) Applicant: MagnaCom Ltd., Moshav Ben Shemen (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/921,749

(22) Filed: Jun. 19, 2013

(65) Prior Publication Data
US 2013/0343480 A1 Dec. 26, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012, provisional application No. 61/768,532, filed on Feb. 24, 2013, provisional application No. 61/807,813, filed on Apr. 3, 2013.

(51) Int. Cl.
*H04L 23/02* (2006.01)
*H04L 25/497* (2006.01)
*H04L 25/03* (2006.01)
*H04L 27/26* (2006.01)
*H04L 25/02* (2006.01)
*H04B 1/66* (2006.01)
*H04L 1/00* (2006.01)

(52) U.S. Cl.
CPC ......... *H04L 25/03821* (2013.01); *H04L 1/0054* (2013.01); *H04L 27/2628* (2013.01); *H04L 25/02* (2013.01)

USPC ........... 375/263; 375/260; 375/259; 375/261; 370/210; 370/203; 370/208; 370/343; 370/310

(58) Field of Classification Search
CPC ............ H04L 25/497; H04L 25/03828; H04L 27/2628; H04L 27/263; H04L 27/2662; H04L 27/2608; H04L 27/2615; H04L 1/002; H04L 1/011; H04L 5/0046; H04L 5/006; H04L 5/001
USPC ......... 375/260, 261, 259, 240, 295, 296, 298, 375/263; 370/210, 208, 203, 343, 310
See application file for complete search history.

(56) References Cited

U.S. PATENT DOCUMENTS

| 4,109,101 A | 8/1978 | Mitani |
| 5,283,813 A | 2/1994 | Shalvi et al. |

(Continued)

OTHER PUBLICATIONS

Miao, George J., Signal Processing for Digital Communications, 2006, Artech House, pp. 375-377.*

(Continued)

*Primary Examiner* — Chieh M Fan
*Assistant Examiner* — Michelle M Koeth
(74) *Attorney, Agent, or Firm* — McAndrews, Held & Malloy, Ltd.

(57) ABSTRACT

A transmitter may comprise a symbol mapper circuit and operate in at least two modes. In a first mode, the number of symbols output by the mapper circuit per orthogonal frequency division multiplexing (OFDM) symbol transmitted by said transmitter may be greater than the number of data-carrying subcarriers used to transmit the OFDM symbol. In a second mode, the number of symbols output by said mapper circuit per orthogonal frequency division multiplexing (OFDM) symbol transmitted by said transmitter is less than or equal to the number of data-carrying subcarriers used to transmit said OFDM symbol. The symbols output by the symbol mapper circuit may be N-QAM symbols. While the circuitry operates in the first mode, the symbols output by the mapper may be converted to physical subcarrier values via filtering and decimation prior to being input to an IFFT circuit.

28 Claims, 15 Drawing Sheets

(56) References Cited

U.S. PATENT DOCUMENTS

| | | | |
|---|---|---|---|
| 5,459,762 A | | 10/1995 | Wang et al. |
| 5,463,661 A | * | 10/1995 | Moran et al. ................ 375/222 |
| 5,602,507 A | | 2/1997 | Suzuki |
| 5,757,855 A | | 5/1998 | Strolle et al. |
| 5,784,415 A | | 7/1998 | Chevillat et al. |
| 5,818,653 A | | 10/1998 | Park et al. |
| 5,886,748 A | | 3/1999 | Lee |
| 5,889,823 A | | 3/1999 | Agazzi et al. |
| 5,915,213 A | | 6/1999 | Iwatsuki et al. |
| 5,930,309 A | | 7/1999 | Knutson et al. |
| 6,233,709 B1 | | 5/2001 | Zhang et al. |
| 6,272,173 B1 | | 8/2001 | Hatamian |
| 6,335,954 B1 | | 1/2002 | Bottomley et al. |
| 6,516,437 B1 | | 2/2003 | Van Stralen et al. |
| 6,535,549 B1 | | 3/2003 | Scott et al. |
| 6,697,441 B1 | | 2/2004 | Bottomley et al. |
| 6,968,021 B1 | | 11/2005 | White et al. |
| 6,985,709 B2 | | 1/2006 | Perets |
| 7,158,324 B2 | | 1/2007 | Stein et al. |
| 7,205,798 B1 | | 4/2007 | Agarwal et al. |
| 7,206,363 B2 | | 4/2007 | Hegde et al. |
| 7,467,338 B2 | | 12/2008 | Saul |
| 7,830,854 B1 | | 11/2010 | Sarkar et al. |
| 7,974,230 B1 | | 7/2011 | Talley et al. |
| 8,005,170 B2 | | 8/2011 | Lee et al. |
| 8,175,186 B1 | | 5/2012 | Wiss et al. |
| 8,248,975 B2 | | 8/2012 | Fujita et al. |
| 8,351,536 B2 | | 1/2013 | Mazet et al. |
| 8,422,589 B2 | | 4/2013 | Edler Von Elbwart et al. |
| 2002/0016938 A1 | | 2/2002 | Starr |
| 2002/0123318 A1 | | 9/2002 | Lagarrigue |
| 2002/0150065 A1 | | 10/2002 | Ponnekanti |
| 2002/0150184 A1 | | 10/2002 | Hafeez et al. |
| 2003/0210352 A1 | | 11/2003 | Fitzsimmons et al. |
| 2004/0170228 A1 | * | 9/2004 | Vadde ........................ 375/260 |
| 2005/0047517 A1 | | 3/2005 | Georgios et al. |
| 2005/0135472 A1 | | 6/2005 | Higashino |
| 2005/0220218 A1 | | 10/2005 | Jensen et al. |
| 2005/0265470 A1 | | 12/2005 | Kishigami et al. |
| 2005/0276317 A1 | | 12/2005 | Jeong et al. |
| 2006/0067396 A1 | | 3/2006 | Christensen |
| 2006/0078065 A1 | * | 4/2006 | Cai et al. .................... 375/297 |
| 2006/0109780 A1 | | 5/2006 | Fechtel |
| 2006/0245765 A1 | | 11/2006 | Elahmadi et al. |
| 2007/0127608 A1 | | 6/2007 | Scheim et al. |
| 2007/0213087 A1 | | 9/2007 | Laroia et al. |
| 2007/0230593 A1 | | 10/2007 | Eliaz et al. |
| 2007/0258517 A1 | | 11/2007 | Rollings et al. |
| 2007/0291719 A1 | | 12/2007 | Demirhan et al. |
| 2008/0002789 A1 | | 1/2008 | Jao et al. |
| 2008/0049598 A1 | | 2/2008 | Ma et al. |
| 2008/0080644 A1 | | 4/2008 | Batruni |
| 2008/0130788 A1 | | 6/2008 | Copeland |
| 2009/0028234 A1 | | 1/2009 | Zhu |
| 2009/0185612 A1 | | 7/2009 | McKown |
| 2009/0290620 A1 | | 11/2009 | Tzannes et al. |
| 2009/0323841 A1 | | 12/2009 | Clerckx et al. |
| 2010/0002692 A1 | | 1/2010 | Bims |
| 2010/0034253 A1 | | 2/2010 | Cohen |
| 2010/0062705 A1 | | 3/2010 | Rajkotia et al. |
| 2010/0166050 A1 | | 7/2010 | Aue |
| 2010/0202505 A1 | | 8/2010 | Yu et al. |
| 2010/0329325 A1 | | 12/2010 | Mobin et al. |
| 2011/0074500 A1 | | 3/2011 | Bouillet et al. |
| 2011/0074506 A1 | | 3/2011 | Kleider et al. |
| 2011/0164492 A1 | * | 7/2011 | Ma et al. .................... 370/210 |
| 2011/0228869 A1 | | 9/2011 | Barsoum et al. |
| 2011/0274212 A1 | * | 11/2011 | Edler Von Elbwart et al. ................ 375/308 |
| 2012/0128099 A1 | * | 5/2012 | Morris et al. ............... 375/297 |
| 2012/0207248 A1 | | 8/2012 | Ahmed et al. |
| 2013/0028299 A1 | | 1/2013 | Tsai |
| 2013/0044877 A1 | | 2/2013 | Liu et al. |
| 2013/0121257 A1 | * | 5/2013 | He et al. .................... 370/329 |

OTHER PUBLICATIONS

Xiong, Fuqin. Digital Modulation Techniques, Artech House, 2006, Chapter 9, pp. 447-483.*

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

* cited by examiner

MULTI-MODE ORTHOGONAL FREQUENCY DIVISION MULTIPLEXING TRANSMITTER FOR HIGHLY-SPECTRALLY-EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012;

U.S. Provisional Patent Application Ser. No. 61/747,132 entitled "Modulation Scheme Based on Partial Response" and filed on Dec. 28, 2012;

U.S. Provisional Patent Application Ser. No. 61/768,532 entitled "High Spectral Efficiency over Non-Linear, AWGN Channels" and filed on Feb. 24, 2013; and U.S. Provisional Patent Application Ser. No. 61/807,813 entitled "High Spectral Efficiency over Non-Linear, AWGN Channels" and filed on Apr. 3, 2013.

Each of the above applications is hereby incorporated herein by reference in its entirety.

INCORPORATIONS BY REFERENCE

This patent application makes reference to:

U.S. patent application Ser No.: 13/754,964 titled "Low-Complexity, Highly-Spectrally-Efficient Communications," and filed on Jan. 31, 2013(now U.S. Pat. No. 8,582,637);

U.S. patent application Ser No.: 13/754,998 titled "Design and Optimization of Partial Response Pulse Shape Filter," and filed on Jan. 31, 2013;

U.S patent application Ser No.: 13/755,001 titled "Constellation Map Optimization for Highly Spectrally Efficient Communications," and filed on Jan. 31, 2013 (now U.S. Pat. No 8,675,769);

U.S. patent application Ser No.: 13/755,008 titled "Dynamic Filter Adjustment for Highly-Spectrally-Efficient Communications," and filed on Jan. 31, 2013 (now U.S. Pat. No. 8,571,131);

U.S patent application Ser No.: 13/755,011 titled "Timing Synchronization for Reception of Highly-Spectrally-Efficient Communications," and filed on Jan. 31, 2013 (now U.S. Pat. No. 8,559,494);

U.S. patent application Ser No.: 13/755,014 titled "Signal Reception Using Non-Linearity-Compensated, Partial Response Feedback," and filed on Jan 31, 2013 (now U.S. Pat. No. 8,559,496);

U.S patent application Ser No.: 13/755,018 titled "Feed Forward Equalization for Highly-Spectrally-Efficient Communications," and filed on Jan. 31, 2013 (now U.S. Pat. No. 8,599,914);

U.S patent application Ser No.: 13/755,021 titled "Decision Feedback Equalizer for Highly Spectrally Efficient Communications," and filed on Jan. 31, 2013 (now U.S. Pat. No. 8,665,941);

U.S patent application Ser No.: 13/755,025 titled "Decision Feedback Equalizer with Multiple Cores for Highly-Spectrally-Efficient Communications," and filed on Jan. 31, 2013;

U.S. patent application Ser No.: 13/755,026 titled "Decision Feedback Equalizer Utilizing Symbol Error Rate Biased Adaptation Function for Highly Spectrally Efficient Communications," and filed on Jan. 31, 2013 (now U.S. Pat. No. 8,559,498);

U.S patent application Ser No.: 13/755,028 titled "Coarse Phase Estimation for Highly-Spectrally-Efficient Communications," and filed on Jan. 31, 2013 (now U.S. Pat. No. 8,548,097);

U.S patent application Ser No.: 13/755,039 titled "Fine Phase Estimation for Highly Spectrally Efficient Communications," and filed on Jan. 31, 2013 (now U.S. Pat. No. 8,565,363);

U.S patent application Ser No.: 13/755,972 titled "Multi-Mode Transmitter for Highly-Spectrally-Efficient Communications," and filed on Jan. 31, 2013;

U.S. patent application Ser No.: 13/755,043 titled "Joint Sequence Estimation of Symbol and Phase With High Tolerance Of Nonlinearity," and filed on Jan. 31, 2013 (now U.S. Pat. No. 8,605,832);

U.S patent application Ser No.: 13/755,050 titled "Adaptive Non-Linear Model for Highly-Spectrally-Efficient Communications," and filed on Jan. 31, 2013 (now U.S. Pat. No. 8,553,821);

U.S. patent application Ser No.: 13/755,052 titled "Pilot Symbol-Aided Sequence Estimation for Highly-Spectrally-Efficient Communications," and filed on Jan. 31, 2013;

U.S patent application Ser No.: 13/755,054 titled "Method and System for Corrupt Symbol Handling for Providing High Reliability Sequences," and filed on Jan. 31, 2013 (now U.S. Pat. No. 8,571,146);

U.S. patent application Ser No.: 13/755,060 titled "Method and System for Forward Error Correction Decoding with Parity Check for Use in Low Complexity Highly-spectrally-efficient Communications," and filed on Jan. 31, 2013 (now U.S. Pat. No. 8,566,687);

U.S patent application Ser No.: 13/755,061 titled "Method and System for Quality of Service (QoS) Awareness in a Single Channel Communication System," and filed on Jan. 31, 2013;

U.S patent application Ser No.: 13/756,079 titled "Pilot Symbol Generation for Highly-Spectrally-Efficient Communications," and filed on Jan. 31, 2013 (now U.S. Pat No. 8,8,665,992);

U.S patent application Ser No.: 13/755,065 titled "Timing Pilot Generation for Highly-Spectrally-Efficient Communications," and filed on Jan. 31, 2013 (now U.S. Pat. No. 8,548,072);

U.S patent application Ser No.: 13/756,010 titled "Multi-Mode Receiver for Highly-Spectrally-Efficient Communications," and filed on Jan. 31, 2013;

U.S patent application Ser No.: 13/755,068 titled "Forward Error Correction with Parity Check Encoding for use in Low Complexity Highly-spectrally-efficient Communications," and filed on Jan. 31, 2013 (now U.S. Pat.No. 8,572,458);

U.S patent application Ser No.: 13/756,469 titled "Highly-Spectrally-Efficient Receiver," and filed on Jan. 31, 2013 (now U.S. Pat. No. 8,526,523);

U.S patent application Ser No.: 13/921,665 titled "Highly-Spectrally-Efficient Transmission Using Orthogonal Frequency Division Multiplexing," and filed on the same date as this application;

U.S patent application Ser No.: 13/921,710 titled "Highly-Spectrally-Efficient Reception Using Orthogonal Frequency Division Multiplexing," and filed on the same date as this application; and U.S patent application Ser No.: 13/921,813 titled "Multi-Mode Orthogonal Frequency Division Multiplexing Receiver for Highly-Spectrally-Efficient Communications," and filed on the same date as this application (now U.S. Pat. No. 8,681,889).

Each of the above applications hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for a multi-mode transmitter for highly-spectrally-efficient communications using orthogonal frequency division multiplexing, substantially as illustrated by and/or described in connection with at least one of the figures, as set forth more completely in the claims.

DETAILED DESCRIPTION

Figure 1A:
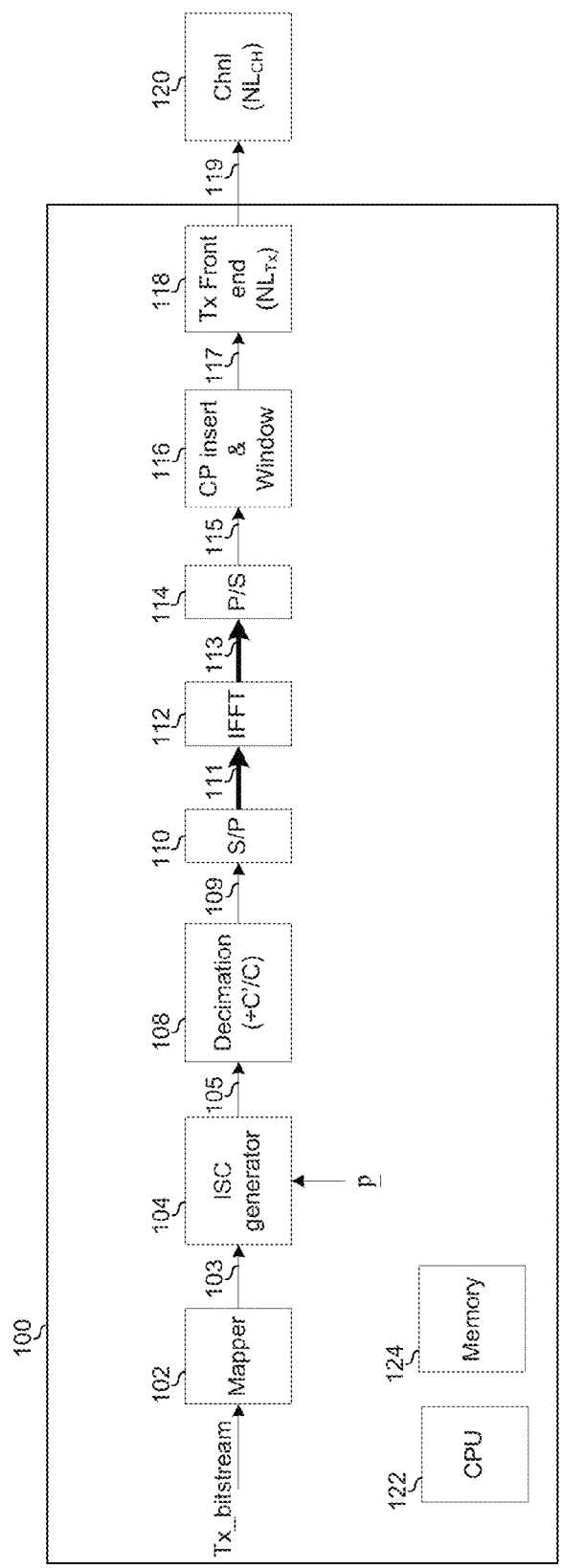
FIG. 1A is a diagram of an example OFDM transmitter.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Orthogonal Frequency Division Multiplexing (OFDM) has gained traction in recent years in high-capacity wireless and wireline communication systems such as WiFi (IEEE Std 802.11n/ac), 3GPP-LTE, and G.hn. One advantage of OFDM is that it can reduce the need for complicated equalization over frequency selective channels. It is particularly powerful in combination with multiple independent spatial streams and multiple antennas, Multiple Input Multiple Output (MIMO) systems. One advantage of OFDM is that it can reduce or eliminate the need for complicated equalization over frequency selective channels. Conventional MIMO-OFDM solutions are based on suboptimal Zero Forcing, SIC (Successive Interference Cancellation), and minimum mean square error (MMSE) receivers. These detection algorithms are significantly inferior to maximum likelihood (ML) and near-ML receivers. Lately, in emerging standards, constellation size continues to increase (256-QAM, 1024-QAM, and so on). The associated ML state space of such solutions is $N^{SS}$, where N and SS stand for the constellation size and total number of MIMO spatial streams, respectively. Consequently, aspects of this disclosure pertain to reduced state/complexity ML decoders that achieve high performance.

Example implementations of the present disclosure may use relatively small constellations with partial response signaling that occupies around half the bandwidth of "ISI-free" or "full response" signaling. Thus, the ML state space is reduced significantly and cost effectiveness of reduced complexity ML detection is correspondingly improved. Additionally, aspects of this disclosure support detection in the presence of phase noise and non-linear distortion without the need of pilot symbols that reduce capacity and spectral efficiency. The spectral compression also provides multidimensional signal representation that improves performance in an AWGN environment as compared to conventional two-dimensional QAM systems. In accordance with an implementation of this disclosure, transmitter shaping filtering may be applied in the frequency domain in order to preserve the independency of the OFDM symbols.

FIG. 1A is a diagram of an example OFDM transmitter. The example transmitter 100 comprises a symbol mapper circuit 102, an inter-symbol correlation (ISC) generation circuit 104, a decimation circuit 108, a serial-to-parallel circuit 110, an inverse fast Fourier transform (IFFT) circuit 112, a parallel-to-serial circuit 114, a cyclic prefix and windowing circuit 116, and a transmit front-end circuit 118. In the example implementation shown, the transmitter transmits into a channel 120.

The symbol mapper circuit 102, may be operable to map, according to a selected modulation scheme, bits of a bitstream to be transmitted ("Tx_bitstream") to symbols. For example, for a quadrature amplitude modulation (QAM) scheme having a symbol alphabet of N (N-QAM), the mapper may map each $Log_2(N)$ bits of the Tx_bitstream to a single symbol represented as a complex number and/or as in-phase (I) and quadrature-phase (Q) components. Although N-QAM is used for illustration in this disclosure, aspects of this disclosure are applicable to any modulation scheme (e.g., pulse amplitude modulation (PAM), amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper 102 may be optimized for best bit-error rate (BER) performance (or adjusted to achieve a target BER) that is related to log-likelihood ratio (LLR) and to optimizing mean mutual information bit (MMIB) (or achieving a target MMIB). The Tx_bitstream may, for example, be the result of bits of data passing through a forward error correction (FEC) encoder and/or an interleaver. Additionally, or alternatively, the symbols out of the mapper 102 may pass through an interleaver.

The ISC generation circuit 104 may be operable to filter the symbols output by the mapper 102 to generate C' virtual subcarrier values (the terminology "virtual subcarrier" is explained below) having a significant, controlled amount of inter-symbol correlation among symbols to be output on different subcarriers (i.e., any particular one of the C' virtual subcarrier values may be correlated with a plurality of the C' symbols output by mapper 102). In other words, the inter-symbol correlation introduced by the ISC generation circuit may be correlation between symbols to be output on different subcarriers. In an example implementation, the ISC generation circuit 104 may be a cyclic filter.

The response of the ISC generation circuit 104 may be determined by a plurality of coefficients, denoted p (where underlining indicates a vector), which may be, for example, stored in memory 124. In an example implementation, the ISC generation circuit 104 may perform a cyclic (or, equivalently, "circular") convolution on sets of C' symbols from the mapper 102 to generate sets of C' virtual subcarrier values conveyed as signal 105. In such an implementation, the ISC generation circuit 104 may thus be described as a circulant matrix that multiplies an input vector of C' symbols by a C'×C' matrix, where each row i+1 of the matrix may be a circularly shifted version of row i of the matrix, i being an integer from 1 to C'. For example, for C'=4 (an arbitrary value chosen for illustration only) and p=[p1 p2 p3 p4], the matrix may be as follows:

$$\begin{bmatrix} p1 & p2 & p3 & p4 \\ p4 & p1 & p2 & p3 \\ p3 & p4 & p1 & p2 \\ p2 & p3 & p4 & p1 \end{bmatrix}$$

In another example, the length of p may be less than C', and zero padding may be used to fill the rows and/or columns to length C' and/or pad the rows and/or columns. For example, C' may be equal to 6 and the matrix above (with p having four elements) may be padded to create a six element vector $p_z$=[p1 p2 p3 p4 0 0] and then $p_z$ may be used to generate a 6 by 6 matrix in the same way that p was used to generate the 4 by 4 matrix. As another example, only the rows may be padded such that the result is a C'×LP matrix, where LP is the length of p (e.g., a 4×6 matrix in the above example). As another example, only the columns may be padded such that the result is a LP×C' matrix, where LP is the length of p (e.g., a 6×4 matrix in the above example).

The decimation circuit 108 may be operable to decimate groups of C' virtual subcarrier values down to C transmitted physical subcarrier values (the term "physical subcarrier" is explained below). Accordingly, the decimation circuit 108 may be operable to perform downsampling and/or upsampling. The decimation factor may be an integer or a fraction. The output of the decimator 108 hence comprises C physical subcarrier values per OFDM symbol. The decimation may introduce significant aliasing in case that the ISC generation circuit 104 does not confine the spectrum below the Nyquist frequency of the decimation. However, in example implementations of this disclosure, such aliasing is allowed and actually improves performance because it provides an additional degree of freedom. The C physical subcarrier values may be communicated using C of C+Δ total subcarriers of the channel 120. Δ may correspond to the number of OFDM subcarriers on the channel 120 that are not used for transmitting data. For example, data may not be transmitted a center subcarrier in order to reduce DC offset issues. As another example, one or more subcarriers may be used as pilots to support phase and frequency error corrections at the receiver. Additionally, zero subcarrier padding may be used to increase the sampling rate that separates the sampling replicas and allow the use of low complexity analog circuitry. The C+Δ subcarriers of channel 120 may be spaced at approximately (e.g., within circuit tolerances) BW/(C+Δ) (according to the Nyquist criterion) and with effective OFDM symbol duration of less than or equal to (C+Δ)/BW (according to the Nyquist criterion). Aspects of the invention may, however, enable the receiver to recover the original C' symbols from the received OFDM symbol (Thus the reason for referring to C' as the number of "virtual subcarriers"). This delivery of C' symbols using C effective subcarriers of bandwidth BW/(C+Δ), and OFDM symbol timing of less than or equal to (C+Δ)/BW thus corresponds to a bandwidth reduction of (C'+Δ)/(C+Δ) or, equivalently, a symbol rate increase of C'/C over conventional OFDM systems (assuming the same number, Δ, of unused subcarriers in the conventional system).

To reduce complexity, in an example implementation, the functionalities of 104 and 108 may be merged by calculating only a subset ($C_S$) of the C physical subcarriers subset from C' by taking out the rows of the matrix that are related to the decimated virtual subcarriers of the ISC generating, C'×C' matrix. For example, decimation of factor of 2 may be achieved by eliminating the even column vectors of the C'×C' matrix described in paragraph [0028] (assuming, for purposes of this example, that the information symbol vector (length of C') is a row vector that left multiplies the matrix).

Generally speaking, in an example implementation wherein the circuit 104 is a cyclic filter, methods and systems of designing the ISC generation circuit 104 may be similar to methods and systems described in U.S. patent application Ser. No. 13/754,998 titled "Design and Optimization of Partial Response Pulse Shape Filter," which is incorporated by reference above. Similar to the design of the filter(s) in the single-carrier case described in U.S. patent application Ser. No. 13/754,998, the design of a cyclic filter implementation of the circuit 104 may be based on using the symbol error rate (SER) union bound as a cost function and may aim to maximize the Euclidean distance associated with one or more identified error patterns. Using a shaping filter characterized by the coefficients p, the distance induced by error pattern $\epsilon$ may be expressed as:

$$\delta^2(\epsilon, \underline{p}) = \sum_n \left| \sum_k p_{[n-k]} \epsilon_{[k]} \right|^2 = \sum_k \sum_l \epsilon_{[k]} \epsilon_{[l]}^* \sum_n p_{[n-k]} p_{[n-l]}^* \quad \text{Eq. 1A}$$

Assuming, for purposes of illustration, a spectral compression factor 2, then, after decimation by 2, EQ. 1A becomes:

$$\delta_2^2(\epsilon, \underline{p}) = \sum_n \left| \sum_k p_{[2n-k]} \epsilon_{[k]} \right|^2 = \quad \text{Eq. 1B}$$

$$\sum_n \left| \sum_k \epsilon_{[2n-2k]} p_{[2k]} + \sum_k \epsilon_{[2n-2k+1]} p_{[2k-1]} \right|^2$$

Where the right-hand-side summation relates to odd-indexed symbols and the left-hand-side summation relates to even-indexed symbols. Eq. 1B may then be rewritten as:

$$\delta_2^2(\epsilon, \underline{p}) = \sum_n \begin{bmatrix} \sum_k \sum_m \epsilon_{[2k]} \epsilon_{[2m]}^* p_{[2n-2k]} p_{[2n-2m]}^* + \\ \sum_k \sum_m \epsilon_{[2k-1]} \epsilon_{[2m-1]}^* p_{[2n-2k+1]} p_{[2n-2m+1]}^* + \\ 2 \cdot \text{Real} \left\{ \sum_k \sum_m \epsilon_{[2k]} \epsilon_{[2m-1]}^* p_{[2n-2k]} p_{[2n-2m+1]}^* \right\} \end{bmatrix} \quad \text{Eq. 1C}$$

In Eq. 1C, the first and second summation terms are associated with the distance of the even-indexed and odd-indexed virtual subcarriers respectively. Accordingly, one goal in designing a cyclic filter implementation of ISC generation circuit 104 may be to maximize the first and second terms of Eq. 1C. The third term takes on both positive and negative values depending on the error pattern. In general, this term will reduce the minimum distance related to the most-probable error patterns. Accordingly, one goal in designing a cyclic filter implementation of ISC generation circuit 104 may be to minimize the third term of Eq. 1C (i e , minimizing cross-correlation between even and odd virtual subcarriers). Additionally or alternatively, a cyclic filter implementation of ISC generation circuit 104 may be designed such that the first and second terms should have similar levels, which may correspond to even-indexed and odd-indexed symbol sequences having comparable distances (i.e., seeking energy balance between even-indexed and odd-indexed virtual subcarriers).

In the presence of frequency-selective fading, the inter-subcarrier correlation created by 104 (by filtering or by matrix multiplication, for example) may be used to overcome the frequency-selective fading and to improve detection performance at the receiver. The processing of inter-subcarrier correlation may be perceived as "analog interleaving" over the frequency domain that spreads each of the C' information symbols over a plurality of frequency subcarriers. As a result of this "analog interleaving," a notch in one of the subcarriers will have a relatively low impact on detection, assuming that the rest of the subcarriers that are carrying that information symbol are received with sufficiently-high SNR.

Additional, or alternative, design goals for the circuit 104 may stem from a desire to reduce complexity of the sequence estimation in the receiver. As an example, one design goal may be, as described in U.S. patent application Ser. No. 13/754,998, maximizing the magnitude of coefficients of "early" (or low-indexed) taps of a cyclic filter implementation of circuit 104. As another example, one design goal may be, as described in U.S. patent application Ser. No. 13/754,998, minimizing the cumulative power of the "late" (or high-indexed) taps of a cyclic filter implementation of circuit 104.

Figure 1B:
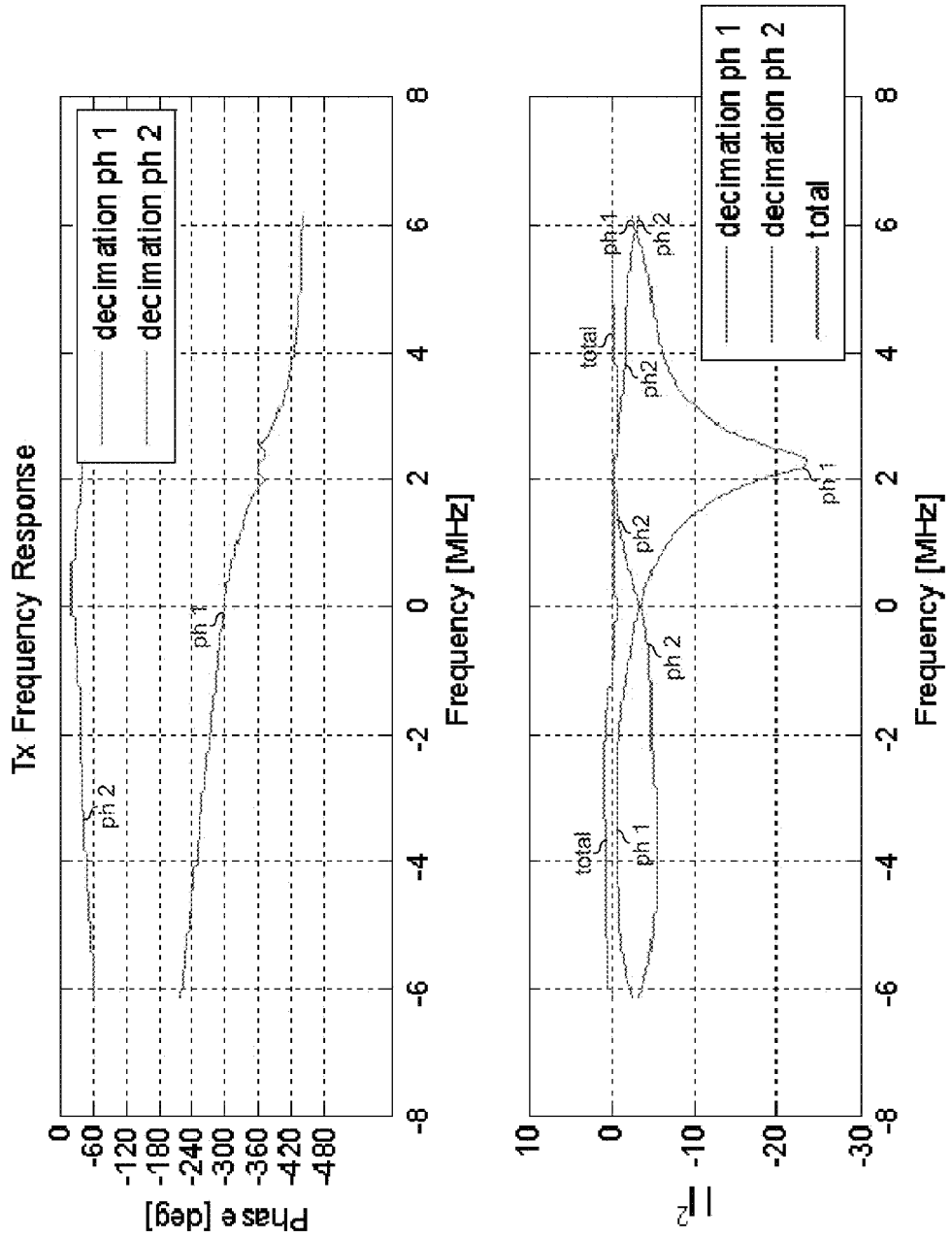
FIG. 1B depicts simulation results of an example cyclic filter for a highly-spectrally-efficient OFDM transmitter.

As shown by the example simulation results in FIG. 1B (compression factor=2 used for purposes of illustration), a complex-valued shaping filter can exploit the full spectrum and make the even-indexed ("ph 1") and odd-indexed responses ("ph 2") substantially orthogonal by using disjoint parts of the spectrum. FIG. 1B shows an example of the frequency response of the even-indexed and odd-indexed coefficients of a cyclic filter implementation of circuit 104 that was designed in accordance with this disclosure. Also, shown in the lower portion of FIG. 1B is the total/combined even and odd response, which, as can be seen, is substantially flat.

Returning to FIG. 1A, the serial-to-parallel circuit 110 may be operable to convert C physical subcarrier values conveyed serially as signal 109 to C physical subcarrier values input conveyed in parallels as signals 111.

In an example implementation, the subcarrier values output by the decimation circuit 108 may be interleaved prior to being input to the circuit 112 and/or the circuit 110 may perform interleaving of the inputted subcarrier values. This interleaver may be operable to improve the tolerance to frequency selective fading caused by multipath that may impose wide notch that spans over several subcarriers. In this case the interleaver may be used to "spread" the notch over non-consecutive (interleaved) subcarriers and therefore reduce the impact of the notch on decoding performance.

Each of the signals 103, 105, 109, and 111 may be frequency-domain signals. The inverse fast Fourier transform (IFFT) circuit 112 may be operable to convert the frequency-domain samples of signals 111 to time-domain samples of signals 113.

The parallel-to-serial circuit 114 may be operable to convert the parallel signals 113 to a serial signal 115.

The circuit 116 may be operable to process the signal 115 to generate the signal 117. The processing may include, for example, insertion of a cyclic prefix. Additionally, or alternatively, the processing may include application of a windowing function to compensate for artifacts that may result when a receiver of the transmitted signal uses the FFT to recover information carried in the transmitted signal. Windowing applied the in transmitter 100 may be instead of, or in addition to, windowing applied in a receiver.

The transmitter front-end 118 may be operable to convert the signal 117 to an analog representation, upconvert the resulting analog signal, and amplify the upconverted signal to generate the signal 119 that is transmitted into the channel 120. Thus, the transmitter front-end 118 may comprise, for example, a digital-to-analog converter (DAC), mixer, and/or power amplifier. The front-end 118 may introduce non-linear distortion and/or phase noise (and/or other non-idealities) to the signal 117. The non-linearity of the circuit 118 may be represented as $NL_{Tx}$ which may be, for example, a polynomial, or an exponential (e.g., Rapp model). The non-linearity may incorporate memory (e.g., Voltera series). In an example implementation, the transmitter 100 may be operable to transmit its settings that relate to the nonlinear distortion inflicted on transmitted signals by the front-end 118. Such transmitted information may enable a receiver to select an appropriate nonlinear distortion model and associated parameters to apply (as described below).

The channel 120 may comprise a wired, wireless, and/or optical communication medium. The signal 119 may propagate through the channel 120 and arrive at a receiver such as the receiver described below with respect to FIG. 2A.

In various example embodiments, subcarrier-dependent bit-loading and time-varying bit-loading may also be used.

Figure 1C:
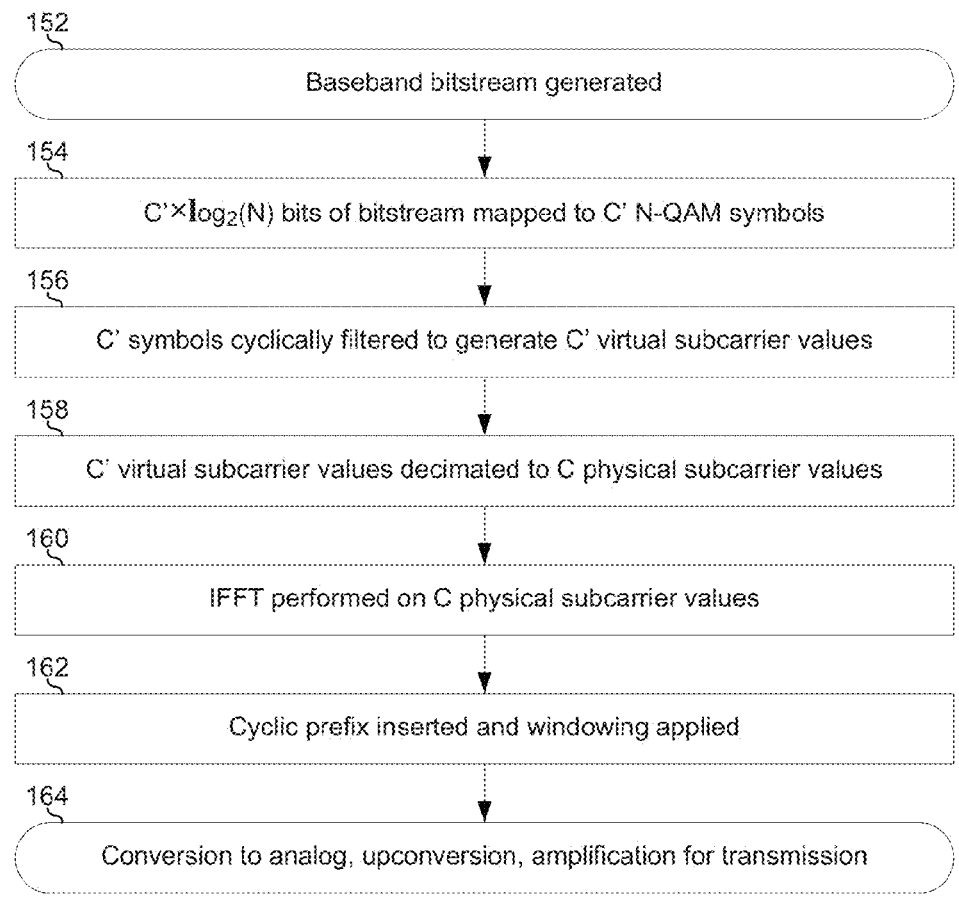
FIG. 1C depicts a flowchart describing operation of an example implementation of a highly-spectrally-efficient OFDM transmitter.

FIG. 1C depicts a flowchart describing operation of an example implementation of a highly-spectrally-efficient OFDM transmitter. The process begins with block 152 in which a baseband bitstream is generated (e.g., by an application running on a smartphone, tablet computer, laptop computer, or other computing device).

In block 154, the baseband bitstream is mapped according to a symbol constellation. In the example implementation depicted, C' (an integer) sets of log 2(N) bits of the baseband bitstream are mapped to C' N-QAM symbols.

In block 156, the C' symbols are cyclically convolved, using a filter designed as described above with reference to FIG. 1A, to generate C' virtual subcarrier values having a significant, controlled amount of inter-symbol correlation among symbols to be output on different subcarriers.

In block 158, the C' virtual subcarrier values output by the ISC generation circuit 104 may be decimated down to C physical subcarrier values, each of which is to be transmitted over a respective one of the C+A OFDM subcarriers of the channel 120. In an example implementation, the decimation may be by a factor of between approximately 1.25 and 3.

In block 160, the C physical subcarrier values are input to the IFFT and a corresponding C+Δ time-domain values are output for transmission over C+Δ subcarriers of the channel 120.

In block 162, a cyclic prefix may be appended to the C time domain samples resulting from block 160. A windowing function may also be applied to the samples after appending the cyclic prefix.

In block 164 the samples resulting from block 162 may be converted to analog, upconverted to RF, amplified, and transmitted into the channel 120 during a OFDM symbol period that is approximately (e.g., within circuit tolerances) (C+Δ)/BW.

Figure 1D:
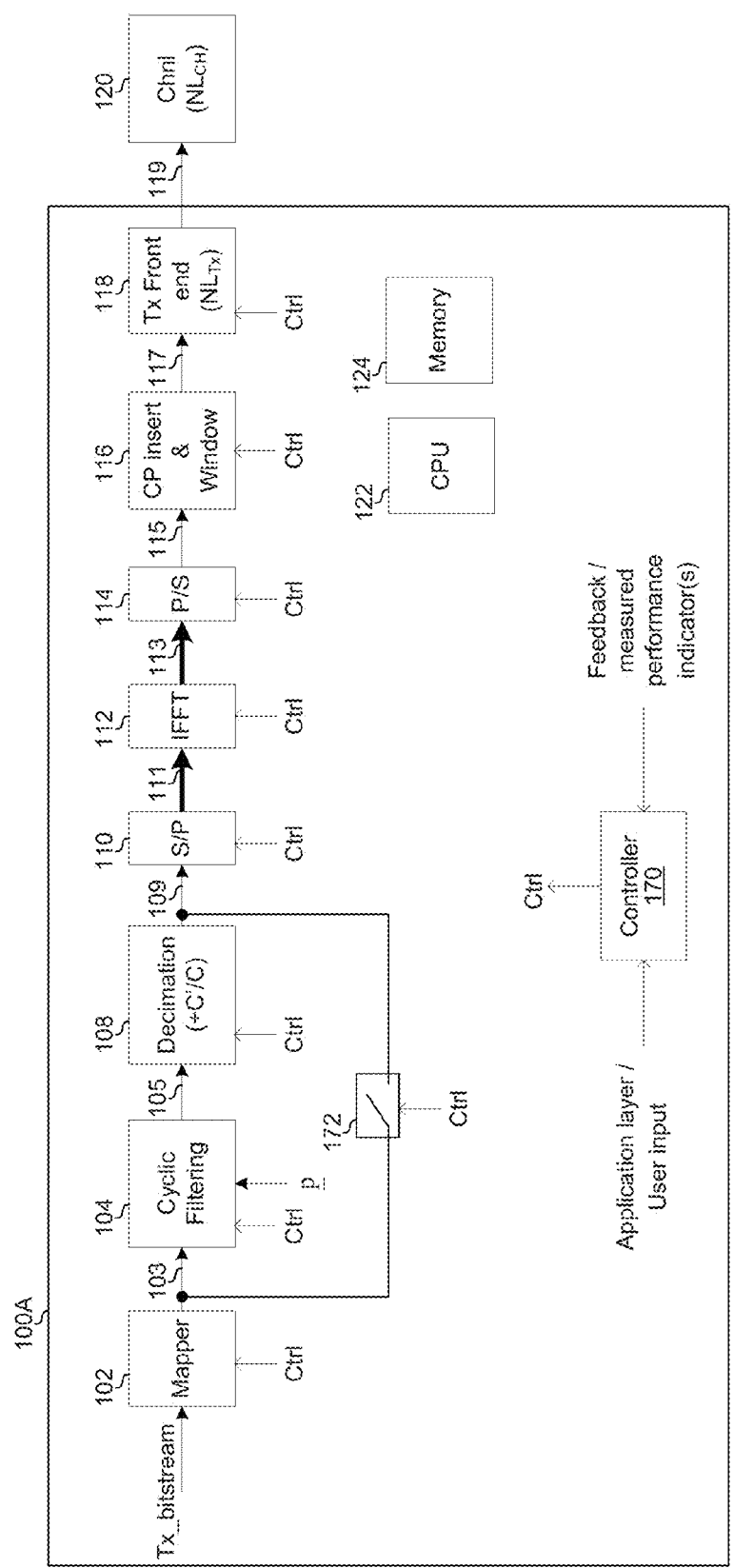
FIG. 1D depicts a first example of a multi-mode OFDM transmitter.

FIG. 1D depicts a first example of a multi-mode OFDM transmitter. The transmitter 100A is an example multi-mode implementation of the transmitter 100 described above. In addition to the components of transmitter 100 described above, the transmitter 100A comprises a control circuit 170 and a switch 172.

The control circuit 170 may comprise, for example, an application specific integrated circuit (ASIC), a programmable interrupt controller (PIC), an ARM-based processor, an x86-based processor, and/or any other suitable circuitry operable to control a configuration of the transmitter 100A based on one or more parameters. The parameters on which the configuration of the transmitter 100A may be based may include, for example, input from a user of, and/or software application running on, a device (e.g., a mobile phone, laptop, base station, or the like) in which the transmitter 100A resides. The parameters on which the configuration of the transmitter 100A may be based may include performance indicators measured by circuitry of the transmitter 100A such as, for example, measured noise levels, temperature, battery charge level, etc. The parameters on which the configuration of the transmitter 100A may be based may include, for example, characteristics of data to be transmitted. Such characteristics may include, for example, quality of service parameters (e.g., latency and/or throughput requirements) and/or a model of non-linear distortion that the data will experience en route to a receiver. The parameters on which the configuration of the transmitter 100A may be based may include performance indicators measured by and fed back from a receiver. Such performance indicators may include, for example, symbol error rate (SER), bit error rate (BER), signal-to-noise ratio (SNR), metrics calculated by a decoding circuit, a phase error measured by the receiver, a measurement indicative of multipath present in the channel, and/or any other relevant performance indicator. The control circuit 170 may indicate a mode of operation of the transmitter 100A and/or control configuration of the various components of the transmitter 100B via one or more control signals ("Ctrl").

The control circuit 170 may also be operable to generate control messages that indicate a configuration of the transmitter 100A. Such control messages may be, for example, inserted into the transmitted datastream and/or transmitted on a control channel or beacon signal, to inform the receiver of the configuration of the transmitter 100A. Such control messages may be used by a multi-mode receiver for configuration of its circuitry.

The Tx front-end 118 may be as described above. Different configurations of the front-end 118 may correspond, for example, to different power back-off settings of an amplifier of the front-end 118. A larger power back-off may correspond to an operating point further away from a reference point (e.g., 1-dB compression point) than an operating point corresponding to a smaller power back-off. Consequently, a larger power back-off setting may correspond to increased linearity at the expense of decreased transmitted power and energy efficiency.

In operation, the transmitter 100A may support a plurality of modes of operation, with each of the modes corresponding to a particular configuration of each of the components of the receiver 100A. In an example implementation, a first mode of operation may be a "full response" OFDM mode where inter-symbol correlation among symbols to be output on different subcarriers is kept below a permissible threshold and C QAM symbols are transmitted using C physical subcarriers (or C' QAM symbols are transmitted using C' physical subcarriers), and a second mode of operation may be a "controlled inter-symbol correlation and/or inter-subcarrier interference (ISCI)" OFDM mode where a substantial amount of inter-symbol correlation is introduced to enable transmitting C' QAM symbols over C physical subcarriers and/or a substantial amount of inter-subcarrier interference may be introduced as a result of increased non-linearity (e.g., by relaxing non-linearity requirements in amplifiers and/or mixers). In the "full response" mode, the switch 172 may be closed and the ISC generation circuit 104 and decimation circuit 108 may be bypassed (and the circuits 104 and 108 may be powered down to save power). Also, in the full response mode, the front-end 118 may be configured to introduce relatively small amounts of non-linear distortion by, for example, reduction of the transmitted power or by increasing the biasing (and consequently the power consumption) of the transmitter chain. In the "controlled ISCI" mode, on the other hand, the switch 172 may be open and the ISC generation circuit 104 and decimation circuit 108 may be powered up and active. Also, in the "controlled ISCI" mode the front-end 118 may be configured to introduce relatively larger amounts of non-linear distortion by, for example, increase of the transmitted power or by decreasing the biasing (and consequently the power consumption) of the transmitter chain.

Figure 1E:
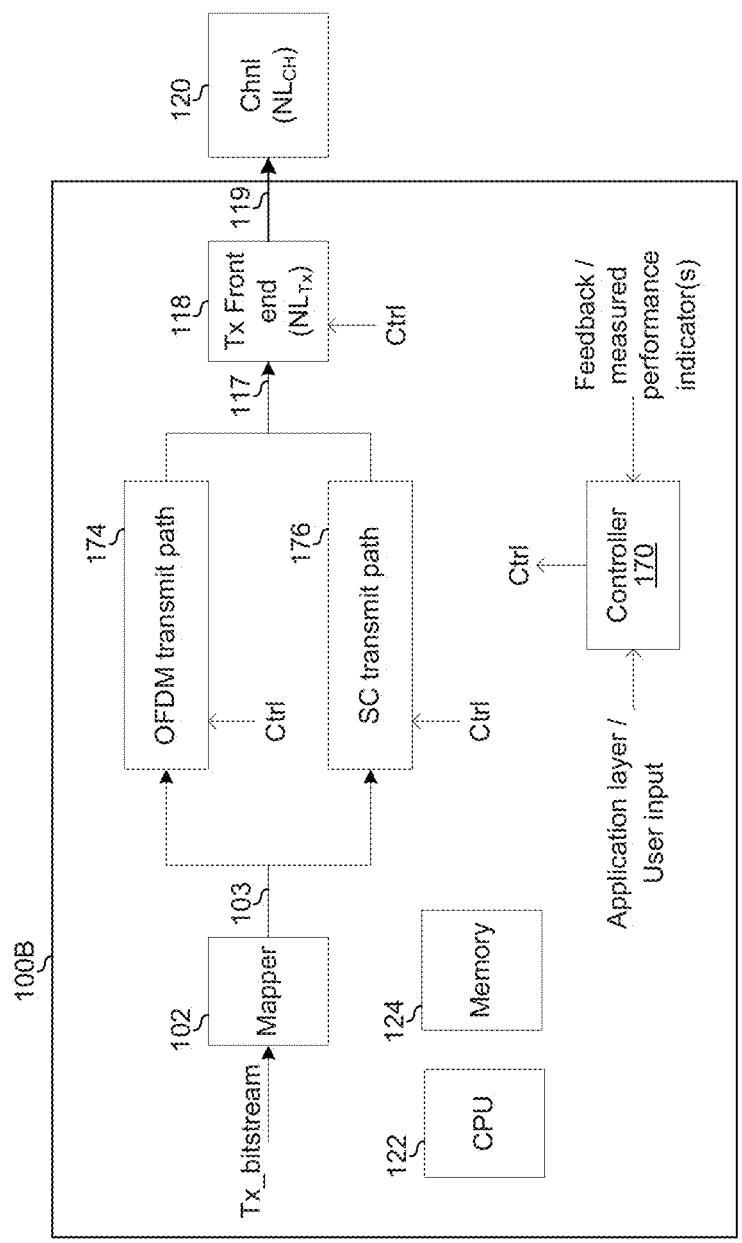
FIG. 1E depicts a second example of a multi-mode OFDM transmitter.

FIG. 1E depicts a second example of a multi-mode OFDM transmitter. The transmitter 100B is an example multi-mode implementation of the transmitter 100 described above. In addition to the components of transmitter 100 described above, the transmitter 100B comprises a control circuit 170 and a single-carrier transmission path 176.

The control circuit 170 may be as described above with reference to FIG. 1D.

The single-carrier transmission path 176 may, for example, comprise a pulse shaper circuit and timing pilot insertion circuit such as the pulse shaper 104 and the timing pilot insert circuit 105 described in the above-incorporated U.S. patent application Ser. No. 13/754,964, titled "Low-Complexity, Highly-Spectrally-Efficient Communications." Thus, the single-carrier transmit path 176 may be operable to transmit highly-spectrally-efficient single-carrier signals having substantial, but controlled, amounts of inter-symbol correlation. The OFDM transmit path 174 may comprise the circuits 104 through 116 described with respect to FIG. 1D above.

Thus, when transmission is via the path 174, substantial amounts of correlation may exist between subcarriers transmitted during the same OFDM symbol period. When transmission is via path 176, on the other hand, substantial amounts of correlation may exist between samples transmitted in successive time periods on the same single carrier.

Figure 1F:
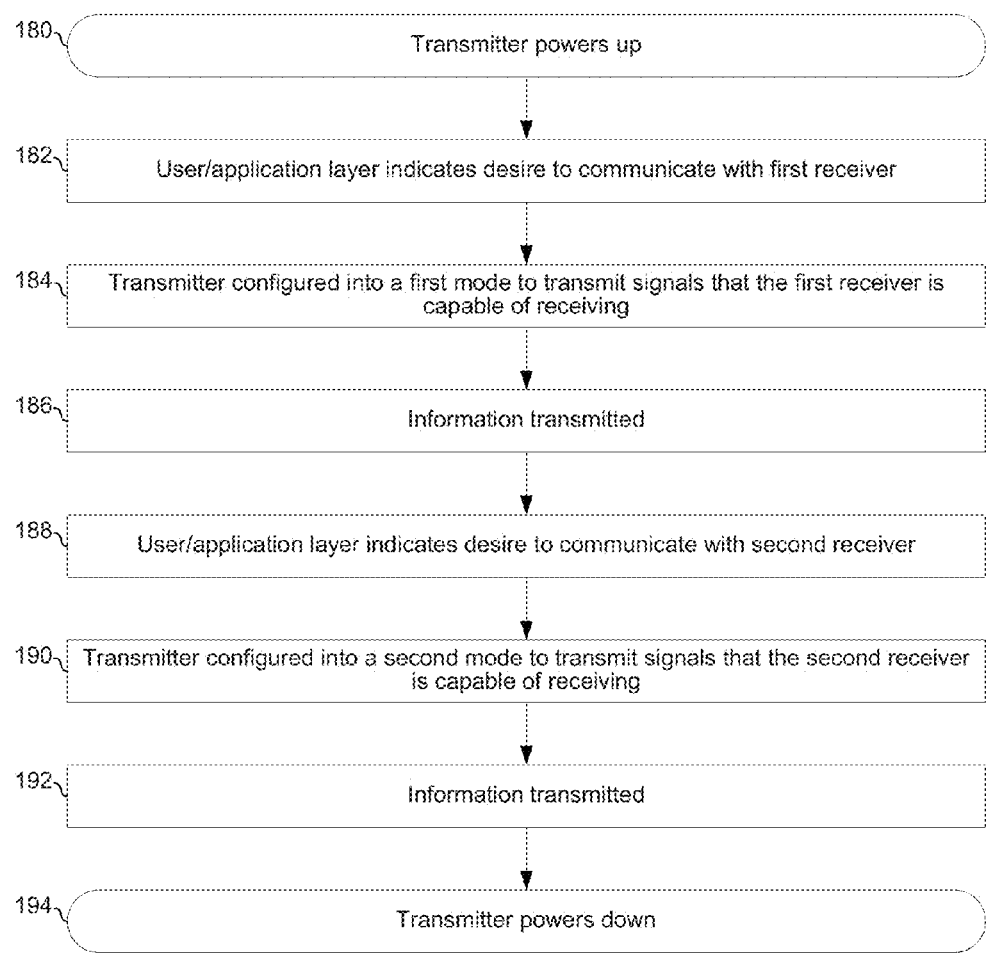
FIG. 1F depicts an example process for configuration of a multi-mode OFDM transmitter.

FIG. 1F depicts an example process for configuration of a multi-mode OFDM transmitter. In block 180, a multi-mode transmitter (e.g., 100A or 100B) powers up.

In block 182 a user and/or application layer of a device (e.g., mobile phone) in which the multi-mode transmitter resides issues a command for the multi-mode transmitter to be configured into a first mode of operation. Such a command may be, for example, in response to a need or desire to communicate with a first receiver that supports a first physical layer protocol/standard. Additionally or alternatively, such a command may be in response to a request sent on behalf of the first receiver (e.g., from a transmitter residing in the first device along with the first receiver). The mode of operation commanded by the user and/or application layer may be selected from a multiple communication modes previously determined to be available in the network. Such determination may, for example, comprise a network discovery period that the device entered upon waking up.

In another example implementation, the command of block 182 may be issued by a network controller such as the one described below with reference to FIG. 5.

In block 184, the multi-mode transmitter is configured into the first mode of operation. For receiver 100A, for example, block 184 may comprise configuration into "full response" mode. For receiver 100B, for example, block 184 may comprise configuration into OFDM mode (i.e., configured to use path 174).

In block 186, information is transmitted, intended for the first receiver, by the multi-mode transmitter configured in the first mode. The first receiver may receive the transmission and process it to recover the transmitted information.

In block 188, a user and/or application layer of a device (e.g., mobile phone) in which the multi-mode transmitter resides issues a command for the multi-mode transmitter to be configured into a second mode of operation. Such a command may be, for example, in response to a need or desire to communicate with a second receiver that supports a second physical layer protocol/standard. Additionally or alternatively, such a command may be in response to a request sent on behalf of the second receiver (e.g., from a transmitter residing in a second device along with a second receiver). In an example implementation, the multi-mode transmitter may, for example, acknowledge the request using mode 1 communications prior to switching to mode 2. The multi-mode transmitter may, for example, be operable to switch between modes on a frame-by-frame basis. In this manner, the multi-mode transmitter may be operable to concurrently communicate with a plurality of remote devices, according to a respective mode of operation of each of the remote devices, according to conditions of a respective channel between the transmitter and each of the remote devices, according to respective distance to each of the remote devices, according to respective performance indications from each of the remote devices, and/or according to commands/requests from the user and/or application layer of the transmitter.

In block 190, the multi-mode transmitter is configured into the second mode of operation. For receiver 100A, for example, block 184 may comprise configuration into "controlled ISCI" mode. For receiver 100B, for example, block 184 may comprise configuration into single-carrier mode (i.e., configured to use path 176).

In block 192, information is transmitted, intended for the second receiver, by the multi-mode transmitter configured in the second mode.

In block 194, the multi-mode transmitter powers down.

In another example implementation, a command to switch to the second mode of operation may be issued although communication is to continue with the first receiver (i.e., the first receiver is also switching to a second mode of operation). For example, the switch may take place in response to detected channel conditions (e.g., measured SNR on one or more particular frequency bands) which may be measured by a receiver of the device in which the multi-mode transmitter resides and/or feedback from the first receiver.

Figure 2A:
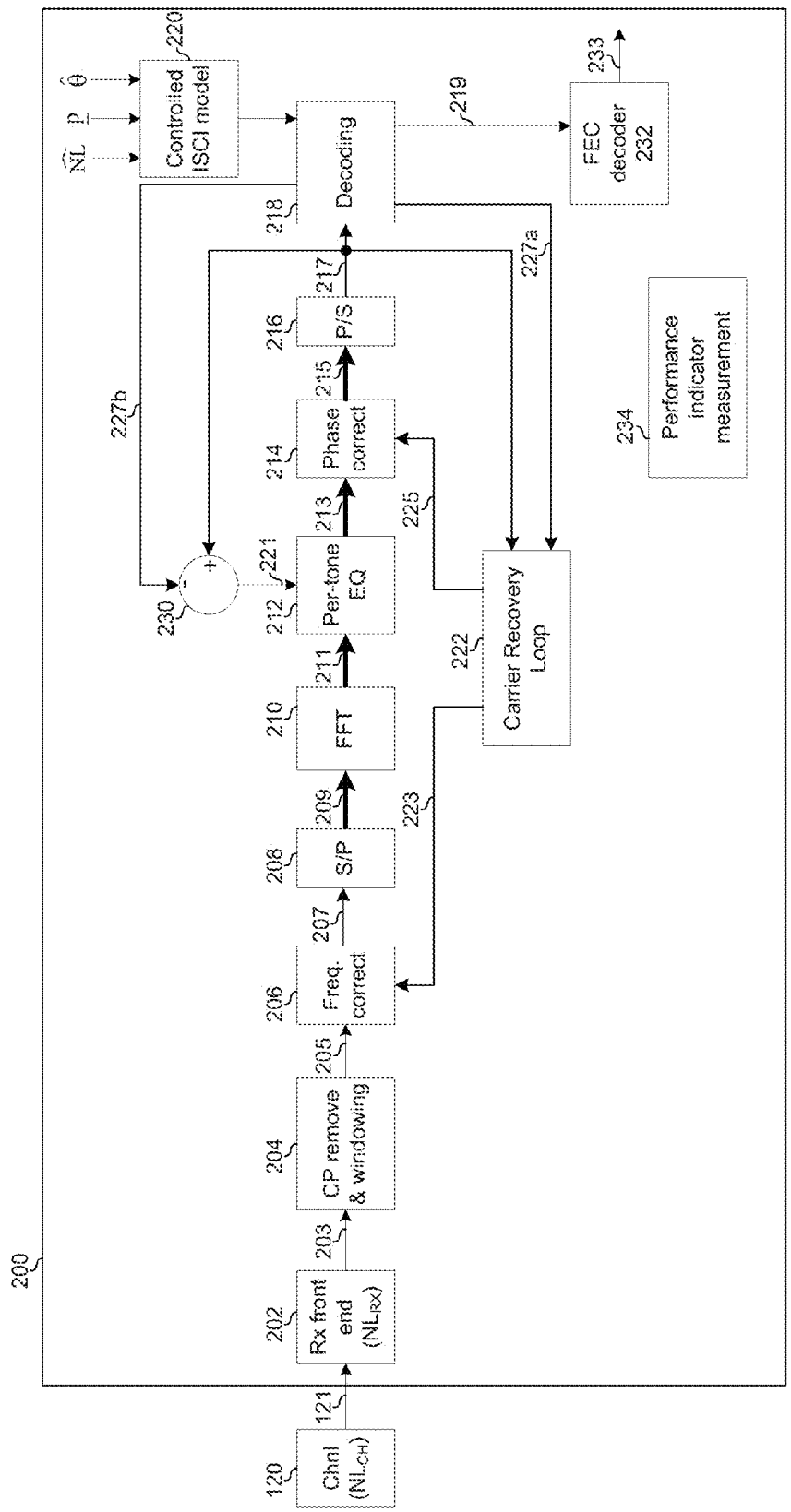
FIG. 2A is a diagram of an example OFDM receiver.

FIG. 2A is a diagram of an example OFDM receiver. The example receiver 200 comprises a front-end 202, a cyclic prefix and windowing circuit 204, a serial-to-parallel conversion circuit 208, a frequency correction circuit 206, a fast Fourier transform (FFT) circuit 210, a per-tone equalizer 212, a phase correction circuit 214, a parallel-to-serial conversion circuit 216, a decoding circuit 218, a controlled combined inter-symbol correlation (ISC) and/or inter-subcarrier interference (ICI) model (Controlled ISCI Model) circuit 220, a carrier recovery loop circuit 222, a FEC decoder circuit 232, and a performance indicator measurement circuit 234.

The receiver front-end 202 may be operable to amplify, downconvert, and/or digitize the signal 121 to generate the signal 203. Thus, the receiver front-end 202 may comprise, for example, a low-noise amplifier, a mixer, and/or an analog-to-digital converter. The front-end 202 may, for example, sample the received signal 121 at least C+Δ times per OFDM symbol period. Due to non-idealities, the receiver front-end 202 may introduce non-linear distortion and/or phase noise to the signal 203. The non-linearity of the front end 202 may be represented as $NL_{Rx}$ which may be, for example, a polynomial, or an exponential (e.g., Rapp model). The non-linearity may incorporate memory (e.g., Voltera series).

The circuit 204 may be operable to process the signal 203 to generate the signal 205. The processing may include, for example, removal of a cyclic prefix. Additionally, or alternatively, the processing may include application of a windowing function to compensate for artifacts that may result from use of an FFT on a signal that is not periodic over the FFT window. Windowing applied in the transmitter 100 may be instead of, or in addition to, windowing applied in a receiver. The output of the circuit 204 may comprise C samples of the received signal corresponding to a particular OFDM symbol received across C+Δ subcarriers.

The frequency correction circuit 206 may be operable to adjust a frequency of signal 205 to compensate for frequency errors which may result from, for example, limited accuracy of frequency sources used for up and down conversions. The frequency correction may be based on feedback signal 223 from the carrier recovery circuit 222.

The serial-to-parallel conversion circuit 208 may be operable to convert C time-domain samples output serially as the signal 207 to C time-domain samples output in parallel as signals 209.

In an example implementation, where interleaving of the subcarrier values was performed in transmitter, the phase/frequency-corrected, equalized subcarrier values output at link 215 may be de-interleaved prior to being input to the circuit 218 and/or the circuit 216 may perform de-interleaving of the subcarrier values. In this case the Controlled ISCI Model 220 (comprising the combined ISC model used by the modulator and/or ICI model reflecting the channel non-idealities) should consider the interleaving operation.

Each of the signals 203, 205, 207, and 209 may be time-domain signals. The fast Fourier transform (FFT) circuit 210 may be operable to convert the time-domain samples conveyed as signals 209 to C physical subcarrier values conveyed as signals 211.

The per-tone equalizer 212 may be operable to perform frequency-domain equalization of each of the C physical subcarrier values to compensate for non-idealities (e.g., multipath, additive white Gaussian noise, (AWGN), etc.) experienced by a corresponding one of the C OFDM subcarriers. In an example implementation, the equalization may comprise multiplying a sample of each of signals 211 by a respective one of C complex coefficients determined by the equalization circuit 212. Such coefficients may be adapted from OFDM symbol to OFDM symbol. Adaption of such coefficients may be based on decisions of decoding circuit 218. In an example implementation, the adaptation may be based on an error signal 221 defined as the difference, output by circuit 230, between the equalized and phase-corrected samples of signal 217 and the corresponding reconstructed signal 227b output by the decoding circuit 218. Generation of the reconstructed signal 227b may be similar to generation of the reconstructed signal 203 in the above-incorporated U.S. patent application Ser. No. 13/754,964 (but modified for the OFDM case, as opposed to the single-carrier case described therein) and/or as described below with reference to FIG. 2D.

The phase correction circuit 214 may be operable to adjust the phase of the received physical subcarrier values. The correction may be based on the feedback signal 225 from the carrier recovery circuit 222 and may compensate for phase errors introduced, for example, by frequency sources in the front-end of the transmitter and/or the front-end 202 of the receiver.

The parallel-to-serial conversion circuit 216 may convert the C physical subcarrier values output in parallel by circuit 214 to a serial representation. The physical subcarrier values bits may then be conveyed serially to the decoding circuit 218. Alternatively, 216 may be bypassed and the decoding at 218 may be done iteratively over the parallel (vector) signal 215.

The controlled ISCI model circuit 220 may be operable to store tap coefficients $\underline{p}$ and/or nonlinearity model $\widehat{NL}$, The stored values may, for example, have been sent to the receiver 200 by the transmitter 100 in one or more control messages. The controlled ISCI model circuit 220 may be operable to convert a time-domain representation of a nonlinearity model to a frequency domain representation. The model 220 may, for example, store (e.g., into a look-up table) multiple sets of filter coefficients and/or nonlinearity models and may be operable to dynamically select (e.g., during operation based on recent measurements) the most appropriate one(s) for the particular circumstances.

The decoding circuit 218 may be operable to process the signal 217 to recover symbols carried therein. In an example implementation, the decoding circuit 218 may be an iterative maximum likelihood or maximum a priori decoder that uses symbol slicing or other techniques that enable estimating individual symbols rather than sequences of symbols. In another example implementation, the decoding circuit 218 may be a sequence estimation circuit operable to perform sequence estimation to determine the C' symbols that were generated in the transmitter corresponding to the received OFDM symbol. Such sequence estimation may be based on maximum likelihood (ML) and/or maximum a priori (MAP) sequence estimation algorithm(s), including reduced-complexity (e.g., storing reduced channel state information) versions thereof. The decoding circuit 218 may be able to recover the C' symbols from the C physical subcarriers (where C'>C) as a result of the controlled inter-symbol correlation and/or aliasing that was introduced by the transmitter (e.g., as a result of processing by ISC generation circuit 104 and/or the aliasing introduced by the decimation circuit 108). The decoding circuit 218 may receive, from circuit 220, a frequency-domain controlled ISCI model of non-linearity, phase noise, and/or other non-idealities experienced by one or more of the C physical subcarrier values arriving at the decoding circuit 218.

The decoding circuit 218 may use the controlled ISCI model to calculate metrics similar to the manner in which a model is used to calculate metrics in above-incorporated U.S. patent application Ser. No. 13/754,964 (but modified for the OFDM case as opposed to the single-carrier case described therein) and/or as described below with reference to FIG. 2C. The decoding circuit 218 may also use the controlled ISCI model provided by circuit 220 to generate signals 227a and 227b, as described herein. In an example implementation, the decoding circuit 218 is operable to get at its input C equalized and phase-corrected physical subcarrier values and generate LLR values associated with the bits of the C' constellation symbols that where originally loaded over the virtual subcarriers of the OFDM transmitter. The LLRs may be generated by checking multiple hypotheses of C' constellation symbols based on the received samples. The best hypothesis may be used to generate the symbols and hard bits detection. In case of using a soft error correction code, an LLR interface that reflects the reliability of the bits (analog signal) rather than the hard bits (i.e., "0", "1") may be used. A remaining one or more of the hypotheses (the second-best, third-best, etc.) may be used to generate the LLR values. For example, assuming that a particular bit was detected as "1" according to the best hypothesis, the LLR for this bit may be provided from the distance of the best hypothesis to the second best hypothesis that estimates this particular bit as "0". The LLR values for the different virtual subcarriers may be weighted according to their respective SNR. In case of frequency-selective fading channel, each subcarrier may have a different gain that corresponds to a different SNR per subcarrier. Because LLR value reflects the bit reliability, in an example implementation, the LLRs may be weighted according to the appropriate subcarrier gain to achieve Maximum Likelihood performance. In an example implementation, log-likelihood ratios (LLRs) determined in a receiver (e.g., in circuit 218) may have a noise variance component that varies with subcarrier. This may be because the per-subcarrier channel gain (due, for example, to the analog channel selection filter circuits and channel) may vary with frequency but the RF front-end gain at the receiver may be fixed.

For each received OFDM symbol, the circuit 220 may generate a frequency-domain controlled ISCI model of the channel over which the OFDM symbol was received. The controlled ISCI model of 220 may account for non-linear distortion experienced by the received OFDM symbol, phase noise experienced by the received OFDM symbol, and/or other non-idealities. For example, a third-order time domain distortion may be modeled in the frequency domain as:

$$y(t) = x(t) \cdot (1 - r \cdot e^{j\varphi} \cdot |x(t)|^2)$$
$$= x(t) - r \cdot e^{j\varphi} \cdot x(t) \cdot x^*(t) \cdot x(t)$$
$$Y(\omega) = X(\omega) - r \cdot e^{j\varphi} \cdot X(\omega) \otimes X^*(-\omega) \otimes X(\omega),$$

where:
$x(t), X(\omega)$—are the input signal in the time domain and frequency domain, respectively;
$y(t), Y(\omega)$—are the distorted output signal in the time domain and frequency domain, respectively;
$r \cdot e^{j\Phi}$—is the complex distortion coefficients;
$(\ )^*$—denotes complex conjugate operator; and
$\otimes$—stands for the convolution operator.

The carrier recovery loop circuit 222 may be operable to recover phase and frequency of one or more of the C OFDM subcarriers of the channel 120. The carrier recovery loop 222 may generate a frequency error signal 223 and a phase error signal 225. The phase and/or frequency error may be determined by comparing physical subcarrier values of signal 217 to a reconstructed signal 227a. Accordingly, the frequency error and/or phase error may be updated from OFDM symbol to OFDM symbol. The reconstructed signal 227b may be generated similar to the manner in which the reconstructed signal 207 of the above-incorporated U.S. patent application Ser. No. 13/754,964 (but modified for the OFDM case, as opposed to the single-carrier case described therein) and/or as described below with reference to FIG. 2D.

The performance indicator measurement circuit 234 may be operable to measure, estimate, and/or otherwise determine characteristics of received signals and convey such performance measurement indications to a transmitter collocated with the receiver 200 for transmitting the feedback to the remote side. Example performance indicators that the circuit 234 may determine and/or convey to a collocated transmitter for transmission of a feedback signal include: signal-to-noise ratio (SNR) per subcarrier (e.g., determined based on frequency-domain values at the output of FFT 210 and corresponding decisions at the output of the decoding circuit 218 and/or FEC decoder 232), symbol error rate (SER) (e.g., measured by decoding circuit 218 and conveyed to the circuit 234), and/or bit error rate (BER) (e.g., measured by the FEC decoder and conveyed to the circuit 234).

Figure 2B:
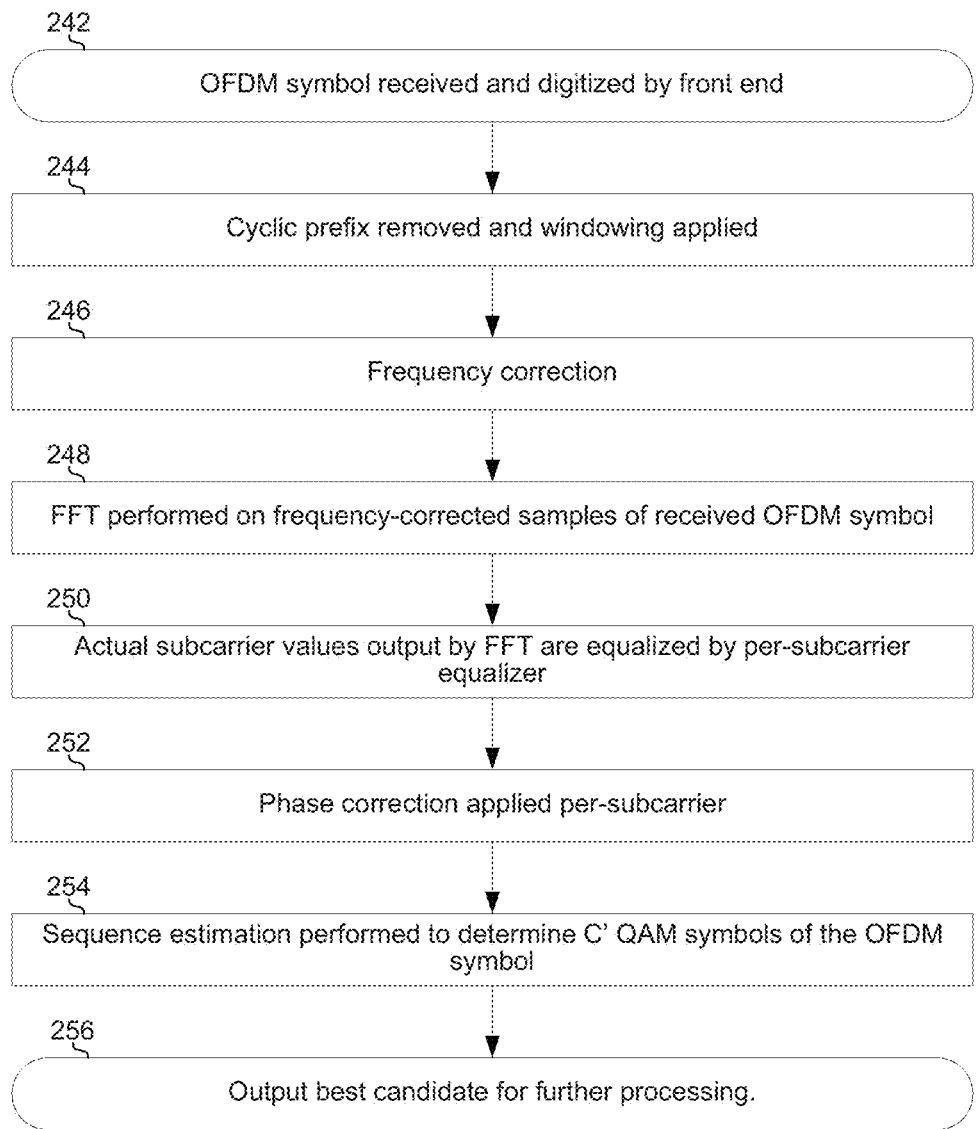
FIGS. 2B and 2C depict a flowchart describing operation of an example implementation of a highly-spectrally-efficient OFDM receiver.
Figure 2C:
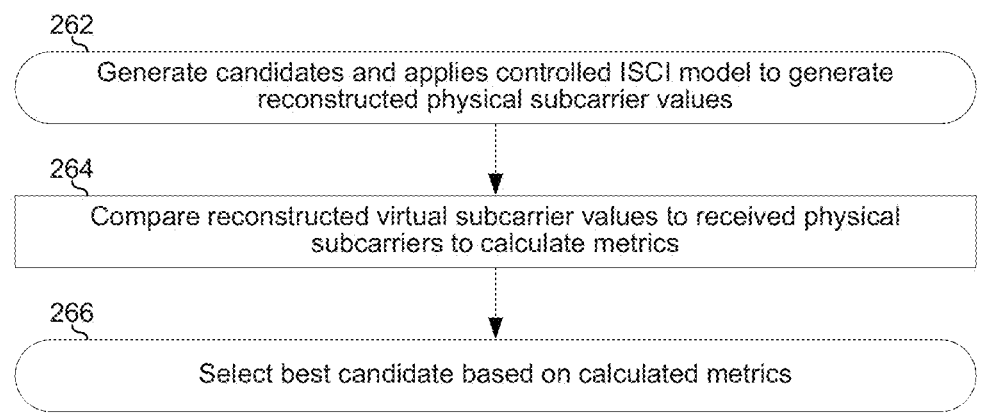

FIGS. 2B and 2C depict a flowchart describing operation of an example implementation of a highly-spectrally-efficient OFDM receiver. The process begins with block 242 in which an OFDM symbol arrives, as signal 121, at front-end 202 and is amplified, down-converted, and digitized to generate C+A+P time-domain samples of the OFDM symbol, where P is the size of the cyclic prefix.

In block 244, the cyclic prefix may be removed and a windowing function may be applied.

In block 246, frequency correction may be applied to the time-domain samples based on an error signal 223 determined by the carrier recovery circuit 222.

In block 248, the frequency corrected time-domain samples are converted to frequency-corrected frequency-domain physical subcarrier values by the FFT circuit 210.

In block 250, the frequency-corrected physical subcarrier values output by the FFT are equalized in the frequency domain by the per-subcarrier equalizer circuit 212.

In block 252, one or more of the frequency-corrected and equalized physical subcarrier values are phase corrected based on a phase correction signal 225 generated by the carrier recovery circuit 222.

In block 254, the vector of C frequency-corrected, equalized, and phase-corrected received physical subcarrier values is input to decoding circuit 218 and sequence estimation is used to determine the best estimates of the vector of C' symbols that resulted in the vector of C frequency-corrected, equalized, and phase-corrected received physical subcarrier values. Example details of metric generation performed during the sequence estimation are described below with reference to FIG. 2C.

In block 256, the best estimate of the vector of C' symbols is determined by decoding circuit 218 and is output as signal 219 to FEC decoder 232, which outputs corrected values on signal 233. Example details of selecting the best candidate vector are described below with reference to FIG. 2C.

Referring to FIG. 2C, in block 262, the decoding circuit 218 generates a plurality of candidate vectors (each candidate vector corresponding to a possible value of the vector of C' symbols generated by the transmitter), and generates a corresponding plurality of reconstructed physical subcarrier vectors by applying the controlled ISCI model to the candidates.

In block 264, the reconstructed physical subcarrier vectors are compared to the vector of frequency-corrected, equalized, and/or phase-corrected received physical subcarrier values to calculate metrics.

In block 266, the candidate vector corresponding to the best metric is selected as the best candidate, and the C' symbols of the best candidate are output as signal 219, to, for example, FEC decoder 232 and/or an interleaver (not shown).

Figure 2D:
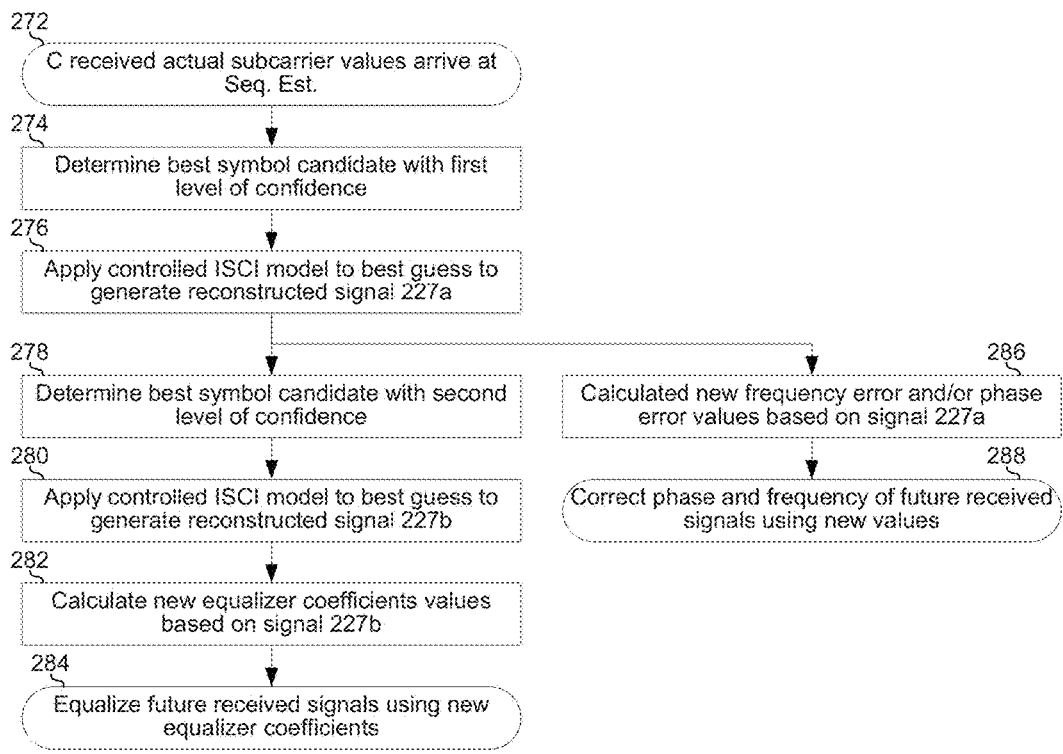
FIG. 2D depicts a flowchart describing operation of an example decoding circuit of a highly-spectrally-efficient OFDM receiver.

FIG. 2D depicts a flowchart describing operation of an example decoding circuit of a highly-spectrally-efficient OFDM receiver. The flowchart begins with block 272 in which a vector of C received physical subcarrier values arrive at decoding circuit 218.

In block 274, the best candidate vector is determined to a first level of confidence. For example, in block 274, the best candidate vector may be determined based on a first number of iterations of a sequence estimation algorithm.

In block 276, the controlled ISCI model may be applied to the best candidate vector determined in block 274 to generate reconstructed signal 227a.

In block 278, the best candidate vector is determined to a second level of confidence. For example, the best candidate determined in block 278 may be based on a second number of iterations of the sequence estimation algorithm, where the second number of iterations is larger than the first number of iterations.

In block 280, the controlled ISCI model may be applied to the best candidate determined in block 278 to generate reconstructed signal 227b.

In block 282, coefficients used by the equalizer 212 are updated/adapted based on the reconstructed signal 227b determined in block 280.

In block 284, subsequent received physical subcarrier values are equalized based on the coefficients calculated in block 282.

Blocks 286 and 288 may occur in parallel with blocks 278-284.

In block 286, the carrier recovery loop 222 may determine frequency and/or phase error based on signal 227a calculated in block 276.

In block 288, samples received during a subsequent OFDM symbol period may be frequency corrected based on the error determined in block 286 and/or subsequent received physical subcarrier values are phase corrected based on the error determined in block 286.

Figure 3A:
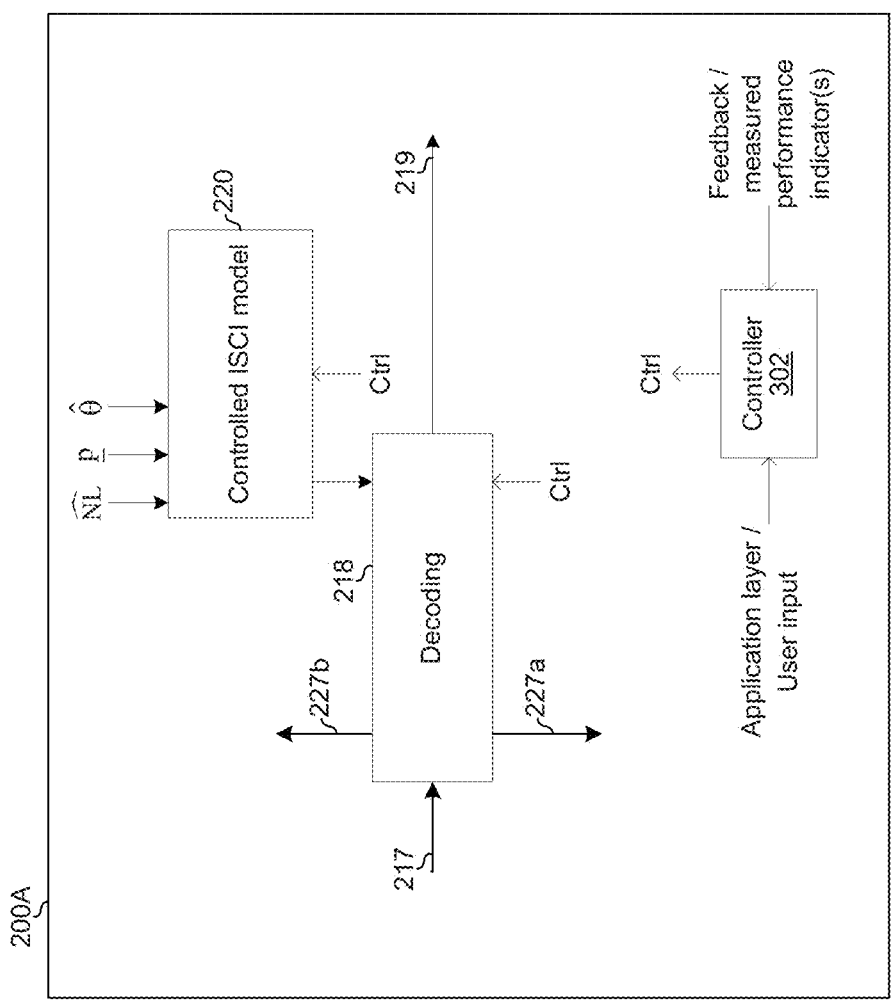
FIG. 3A depicts a first example of a multi-mode OFDM receiver.

FIG. 3A depicts a first example of a multi-mode OFDM receiver. The receiver 200A is an example multi-mode implementation of the receiver 200 described above. In addition to the components of receiver 200 described above (for clarity of illustration only the decoding circuit 218 and the controlled ISCI model circuit 220 are shown), the receiver 200A comprises a control circuit 302.

The control circuit 302 may comprise, for example, an application specific integrated circuit (ASIC), a programmable interrupt controller (PIC), an ARM-based processor, an x86-based processor, and/or any other suitable circuitry operable to control a configuration of the receiver based on one or more parameters. The parameters on which the configuration of the receiver 200A may be based may include, for example, input from a user of, and/or software application running 200A on, a device (e.g., a mobile phone, laptop, base station, or the like) in which the receiver resides. The parameters on which the configuration of the receiver 200A may be based may include performance indicators measured by circuitry of the receiver 200A such as, for example, measured noise levels, temperature, battery charge level, symbol error rate (SER), bit error rate (BER), signal-to-noise ratio (SNR), metrics calculated by decoding circuit 218, inputs to the controlled ISCI model circuit 220, an output of the controlled ISCI model 229, a phase error measured by the receiver, a measurement indicative of an amount of multipath in the channel, and/or any other relevant performance indicator. The parameters on which the configuration of the receiver 200A may be based may include characteristics of data to be received. Such characteristics may include, for example, quality of service parameters (e.g., latency and/or throughput requirements) and/or a model of non-linear distortion experienced by the data during transmission, propagation over the channel, and/or reception by the receiver 200A. The parameters on which the configuration of the receiver 200A is based may be communicated (e.g., in a beacon signal) by a transmitter from which the receiver 200A desires to receive communications. Such parameters may include, for example, power back-off (and/or other indications of non-linearity) symbol constellation in use, baud rate, etc. The parameters on which the configuration of the receiver may be based may include a mode of operation of a transmitter from which the receiver desires to receive communications. Such mode of operation may, for example, be communicated to the receiver 200A in a control message (e.g., in a beacon signal) and relayed to the control circuit 302.

The control circuit 302 may also be operable to generate control messages that indicate, for example, a configuration of the receiver 200A, channel and/or other communication conditions. Example channel and/or communication conditions include signal-to-noise ratio of the channel, bandwidth of the channel, frequency-selective fading detected on the channel, quality of service requirements of the receiver, bit-error rate in the receiver, symbol error rate in the receiver, and/or packet error rate in the receiver. Such control messages may be, for example, inserted into the transmitted datastream and/or transmitted on a control channel or beacon signal, to provide feedback to a transmitter. Such control messages may be used by a multi-mode transmitter for configuration of its circuitry.

In operation, the receiver 200A may support a plurality of modes of operation, with each of the modes corresponding to a particular configuration of the decoding circuit 218 and the controlled ISCI model 220.

In an example implementation, a first mode of operation may be a "full response" OFDM mode and a second mode may be a "controlled ISCI" mode. In the full response mode, the decoding circuit 218 and controlled ISCI model circuit 220 may be configured to processes OFDM symbols having relatively low inter-symbol correlation among symbols received on different subcarriers (e.g., below a permissible threshold) to recover C QAM (or PAM, QPSK, etc.) symbols from C physical subcarriers or to recover C' QAM (or PAM, QPSK, etc.) symbols from C' physical subcarriers. In the "full response" mode, p may be unused in the controlled ISCI model circuit 220 or may be set to values (e.g., the identity matrix) that do not introduce inter-symbol correlation among symbols to be output on different subcarriers during matrix multiplication of a candidate vector, or the controlled ISCI model circuit 220 may be bypassed and turned off as well as decoding circuit 218. In the controlled ISCI mode, the decoding circuit 218 and controlled ISCI model circuit 220 may be configured to processes OFDM symbols having a substantial amount of inter-symbol correlation among symbols output on different subcarriers intentionally introduced by the transmitter and to recover C' QAM (or PAM, QPSK, etc.) symbols from C physical subcarriers.

Figure 3B:
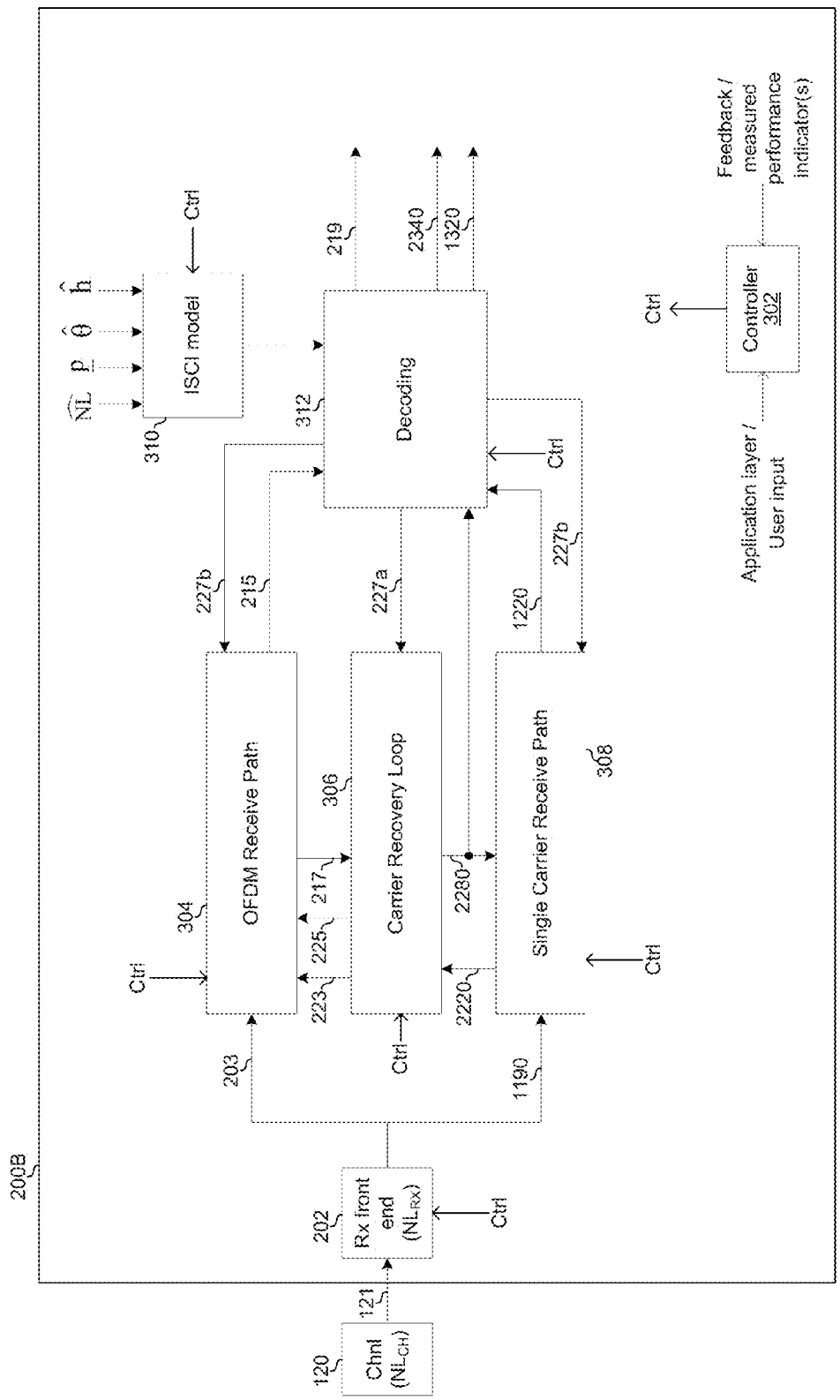
FIG. 3B depicts a second example of a multi-mode OFDM receiver.

FIG. 3B depicts a second example of a multi-mode OFDM receiver. The receiver 200B comprises a control circuit 302, an OFDM receive path 304, a carrier recovery loop 306, a single carrier receive path 308, an inter-symbol correlation and/or inter-subcarrier interference (ISCI) modeling circuit 310, and a decoding circuit 312.

The control circuit 302 may be as described above.

The OFDM receive path may, for example comprise components 204-216, and 230 described above with reference to FIG. 2A. The signals 203, 215, 223, 225, and 217 may be as described above.

The carrier recovery circuit 306 may be operable to perform functions of the carrier recovery circuit 222 described above and the carrier recovery circuit 208 described in the above-incorporated U.S. patent application Ser. No. 13/754,964 titled "Low-Complexity, Highly-Spectrally-Efficient Communications." The signals 223, 225, 217, and 227a may be as described above in this application. The signals 2220 and 2280 may correspond to signals 222 and 228, respectively, of the above-incorporated U.S. patent application Ser. No. 13/754,964 titled "Low-Complexity, Highly-Spectrally-Efficient Communications."

The single-carrier receive path 308 may comprise components 109, 110, 202, 204, 206, and 212 of the above-incorporated U.S. patent application Ser. No. 13/754,964 titled "Low-Complexity, Highly-Spectrally-Efficient Communications." The signals 1190 and 1220 may correspond to signals 119 and 122 (or, equivalently, signal 232), respectively, of the above-incorporated U.S. patent application Ser. No. 13/754,964 titled "Low-Complexity, Highly-Spectrally-Efficient Communications."

The decoding circuit 312 may be operable to perform functions of the decoding circuit 218 described above and the decoding circuit 210 and nonlinearity circuits 236a and 236b of the above-incorporated U.S. patent application Ser. No. 13/754,964 titled "Low-Complexity, Highly-Spectrally-Efficient Communications." The signals 227b, 215, 227a, and 219 may be as described above. The signals 2340 and 1320 may correspond to signals 234 and 132, respectively, of the above-incorporated U.S. patent application Ser. No. 13/754,964 titled "Low-Complexity, Highly-Spectrally-Efficient Communications."

When the receiver is configured to use path 304 ("controlled ISCI OFDM mode"), ISCI model circuit 310 may perform functions of the circuit 220 described above. When the receiver is configured to use path 308 ("controlled ISI mode") the ISCI model circuit 310 may convey $\hat{h}$ and/or $\widehat{F_{NL}}$ (each of which is described in the above-incorporated U.S. patent application Ser. No. 13/754,964 titled "Low-Complexity, Highly-Spectrally-Efficient Communications.") as to the decoding circuit 312.

In operation, when the receiver 200B is configured to use path 304, the sequence estimation may perform sequence estimation on samples received via C physical subcarriers to recover C' QAM (or PAM, QPSK, et.) symbols per OFDM symbol period. When the receiver 200B is configured to use path 308, the sequence estimation may perform sequence estimation on a received single-carrier partial response signal.

Figure 3C:
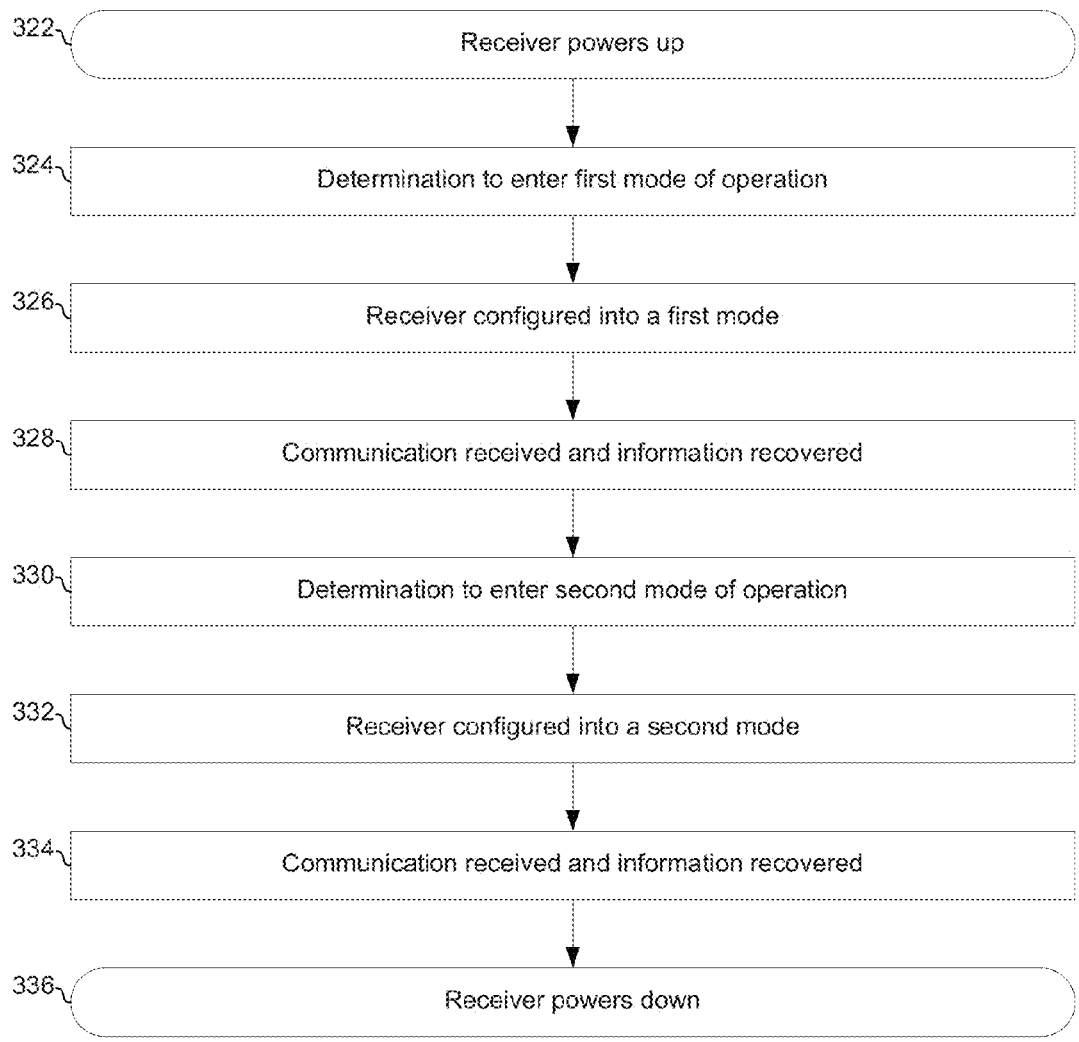
FIG. 3C depicts an example process for configuration of a multi-mode OFDM transmitter.

FIG. 3C depicts an example process for configuration of a multi-mode OFDM transmitter.

In block 322, the receiver powers up.

In block 324, the receiver determines to enter a first mode of operation. For example, the receiver 200A may determine to enter a "full response" mode. As another example, the receiver 200B may determine to enter a "single-carrier mode." This determination may be made based on, for example, a user and/or application layer of the device in which the receiver resides indicating a need to communicate in accordance with the first mode of operation. This determination may additionally or alternatively be made based on, for example, the first mode being a default mode which the receiver may use to listen for availability/support (e.g., via broadcast beacons) of a second mode of operation by transmitters of other, in-range devices. This determination may additionally or alternatively be made based on, for example, measurements by the receiver (e.g., signal strength and/or signal-to-noise ratio on particular frequency bands, quality of service requirements, and/or the like) and/or input from other sensors or receivers (e.g., Wi-Fi, Bluetooth, and/or GPS receivers).

In an example implementation, prior to deciding, or upon deciding, to enter a first mode of operation, the receiver may send feedback to a transmitting device from which the receiver desires to receive communications while operating the first mode. The feedback may include, for example, the configuration of the receiver and/or channel and/or other communication conditions (e.g., SNR of one or more bands on the channel, quality of service requirements of the receiver, bit error rates in the receiver, symbol error rates in the receiver, packet error rates in the receiver, and/or the like).

In block 326, the receiver may be configured into the first mode and begin listening for communications. In an example implementation, a transmitter of the device in which the receiver resides may transmit (e.g., broadcast) the determined configuration of the receiver.

In block 328, a signal may be received and processed by the receiver operating in the first mode to recover information contained in the received signal. For example, in the receiver 200A block 328 may comprise processing an OFDM symbol received on C subcarriers to recover C QAM symbols. As another example, in the receiver 200B, block 328 may comprise processing a receive inter-symbol correlated (ISC) as described in above-incorporated U.S. patent application Ser. No. 13/754,964 titled "Low-Complexity, Highly-Spectrally-Efficient Communications."

In block 330, the receiver determines to enter a second mode of operation. This determination may be based, for example, on one or of the considerations described with respect to block 324. Additionally or alternatively, this determination may be based on the information recovered in block 330 (e.g., a control message instructing transition to the second mode).

In an example implementation, prior to deciding, or upon deciding, to enter a first mode of operation, the receiver may send feedback to a transmitting device from which the receiver desires to receive communications while operating the second mode. The feedback may include, for example, the configuration of the receiver and/or channel and/or other communication conditions (e.g., SNR of one or more bands on the channel, quality of service requirements of the receiver, bit error rates in the receiver, symbol error rates in the receiver, packet error rates in the receiver, and/or the like).

In block 332, the receiver may be configured into the second mode and begin listening for communications. In an example implementation, a transmitter of the device in which the receiver resides may transmit (e.g., broadcast) the determined configuration of the receiver.

In block 334, a signal may be received and processed by the receiver operating in the second mode to recover information contained in the received signal. For example, in the receiver 200A block 334 may comprise processing an OFDM symbol received on C subcarriers to recover C' QAM symbols. As another example, in the receiver 200B, block 328 may comprise processing an OFDM symbol received on C subcarriers to recover C' QAM symbols.

Figure 4:
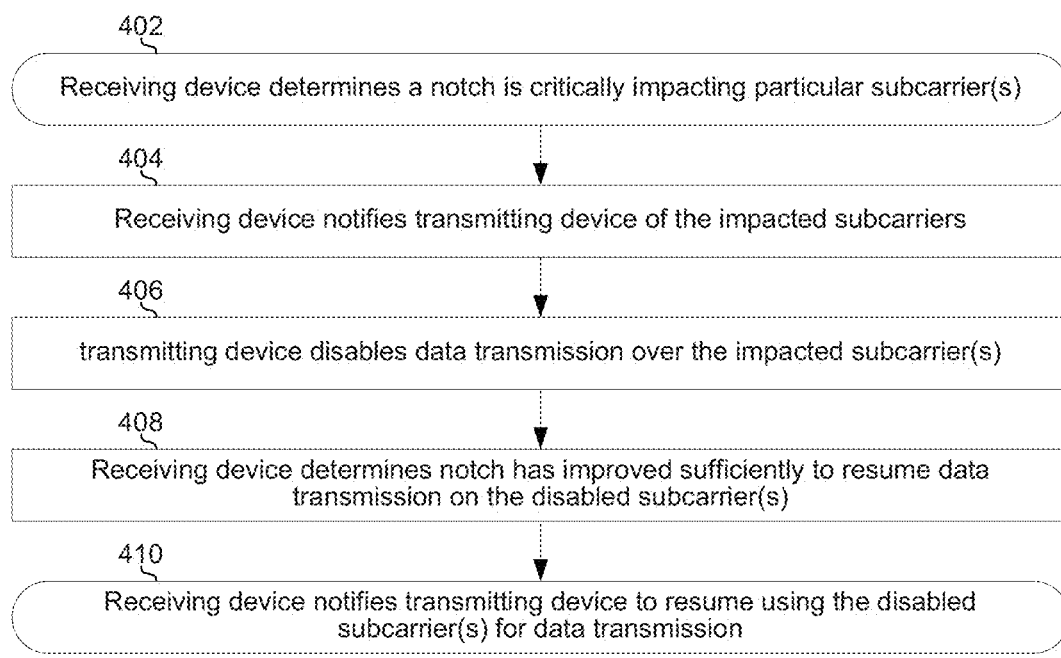
FIG. 4 is a flowchart describing a process for mitigating the effects of frequency-selective fading in a multi-mode communication system.

FIG. 4 is a flowchart describing a process for mitigating the effects of frequency-selective fading in a multi-mode communication system. In case of frequency selective fading channel, feedback from a receiving device may be used to dynamically adapt transmission properties.

In block 402, while transmitting device and receiving device are communicating using OFDM, frequency selective fading is causing a significant notch that is critically impacting one or more subcarriers. For example, the notch may be reducing the received SNR of the subcarrier(s) below a certain level (e.g., a level that is predetermined and/or algorithmically controlled during run time).

In block 404, an identification of such impacted subcarrier(s) may be sent from the receiving device to the transmitting device (e.g., over a control channel).

In block 406, in an example implementation, in response to receiving the indication sent in block 304, the transmitting device disables transmission of data over the impacted subcarrier(s). The transmitting device may disable transmission of data over the impacted subcarrier(s) by, for example, reconfiguring the mapper 102 (e.g., changing the value of C' and/or configuring the mapper 102 to insert pilot symbols between data symbols), changing _p, reconfiguring the decimation circuit 108 (e.g., changing the value of C), and/or reconfiguring the mapping performed by the serial-to-parallel circuit 110. In another example implementation, in response to the indication sent in block 304, the transmitting device may switch from a partial response OFDM mode to a full response OFDM mode, which may be less sensitive to deep notches than the partial response OFDM mode. For example, when more than a threshold number of subcarriers are being critically impacted, the transmitter may decide (or may receive a decision from the receiver) to switch from a partial response OFDM mode to a full response OFDM mode. In another example implementation, in response to the indication sent in block 304, the transmitting device may switch from a partial response OFDM mode to a single-carrier mode to use a single channel that is not being critically impacted. For example, when more than a threshold number of subcarriers are being critically impacted, the transmitter may decide (or may receive a decision from the receiver) to switch from a partial response OFDM mode to a single-carrier mode. Because single-carrier mode may actually be being more sensitive to deep notches, it may be preferable to instead switch to full response OFDM mode rather than to single-carrier mode).

In block 408, the receiving device may determine that data transmission on the disabled subcarriers should resume.

In block 410, in an example implementation, the instruction to resume data transmission on the disabled subcarrier(s) may be sent (e.g., via a control channel). In another example implementation, where the communications had switched from OFDM to single-carrier, block 408 may comprise a switch back to OFDM may occur. In another example implementation, where the communications had switched from partial response OFDM to full response OFDM, block 410 may comprise a switch back to partial response OFDM. In an example implementation, such a determination may be made by monitoring pilot signal(s) that the transmitting device transmits on the disabled subcarrier(s). For example, the receiving device may monitor a characteristic (e.g., SNR) of the pilot signal(s) and determine to resume use of the subcarriers(s) upon a significant and/or sustained change in the characteristic (e.g., upon SNR of the pilot signal(s) increasing above a determined threshold for a determined amount of time). In an example implementation, the determination to resume data transmission on the disabled subcarrier(s) may be based on the one or more characteristics of subcarriers adjacent to the disabled subcarrier(s). For example, while subcarrier N is disabled, the receiving device may monitor SNR of adjacent subcarriers N−1 and/or N+1, and may decide enable subcarrier N in response to a significant and/or sustained increase in the SNR of subcarrier(s) N−1 and/or N+1. The first example above for SNR estimation of disabled subcarrier(s) which is based on pilots, may be more accurate than the second example which is based on SNR estimation using adjacent subcarriers. However, the second example does not "waste" power on pilot subcarrier(s) transmission thus may provide higher power for the information (modulated) subcarriers assuming that the transmitted power is fixed. The relative increased power of the modulated subcarriers may improve decoding performance (e.g., SER, BER, packet error rate).

Similarly, feedback from the receiving device (e.g., in the form of subcarrier SNR measurements) may be used to adapt the inter-symbol correlation (ISC) generation circuit 104 and/or decimation circuit 108. Such adaptation may, for example, give relatively-high-SNR subcarriers relatively-high coefficients and relatively-low-SNR subcarriers relatively-low coefficients. Such adaptation of coefficients may be used to optimize communication capacity (or to achieve a target communication capacity) between the transmitting device and the receiving device. The control channel latency and adaptation rate may be controlled to be fast enough to accommodate channel coherence time.

Figure 5:
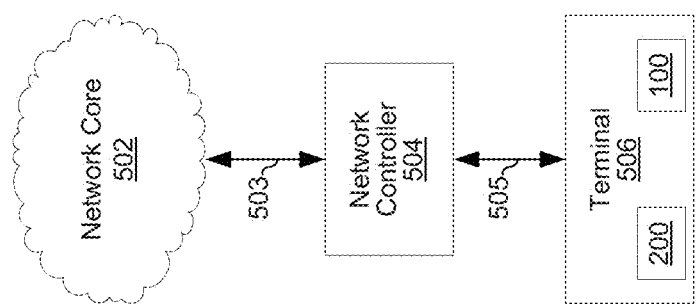
FIG. 5 is a diagram of an example network in which aspects of this disclosure are in use.

FIG. 5 is a diagram of an example network in which aspects of this disclosure are in use. Shown in FIG. 5 are a network core 502, a network controller 504, and a terminal 506. The network core 502 may be, for example, a wide area network (WAN) (e.g., the Internet), a local area network (LAN), cellular provider core network, and/or the like. The network controller 504 may be, for example, a LAN access point, a wireless LAN access point, a cellular base station, a cellular radio network controller, and/or the like. The link 503 may be wired, wireless, and/or optical. The terminal 506 may be, for example, a personal computer, a smartphone, a table computer, and/or the like. The link 505 may be wired, wireless, and/or optical.

In an example implementation, circuitry of a transmitter (e.g., 100) may comprise a symbol mapper circuit (e.g., 102) and capable of operating in at least two modes. While the circuitry operates in a first of the modes, the number of symbols output by the mapper circuit for a first-mode orthogonal frequency division multiplexing (OFDM) symbol transmitted by the transmitter may be greater than the number of data-carrying subcarriers used to transmit the first-mode OFDM symbol. While the circuitry operates in a second of the modes, the number of symbols output by the mapper circuit for a second-mode orthogonal frequency division multiplexing (OFDM) symbol transmitted by the transmitter may be less than or equal to the number of data-carrying subcarriers used to transmit the second-mode OFDM symbol. The first-mode OFDM symbol and the second mode OFDM symbol may be transmitted via a channel having significant amount of nonlinearity. The nonlinearity may degrade a reception performance metric (e.g., symbol error rate, bit error rate, packet error rate, or the like) of the first-mode OFDM symbol by less than 1 dB. The nonlinearity may degrade the reception performance metric of the second-mode OFDM symbol by 1 dB or more. The second-mode OFDM symbol may be transmitted via a channel having nonlinearity that degrades the performance metric by less than 1 dB. The first-mode OFDM may be generated via a decimation which introduces a significant amount of aliasing such that the ratio of P1 to P2 is equal to or less than a threshold signal-to-noise ratio of a receiver to which the OFDM subcarriers are transmitted, where P1 is total signal power of the C' virtual subcarrier values prior to the decimating, and P2 is the signal power of a portion of the C' virtual subcarrier values residing at a frequency above a folding frequency determined by a decimation factor (e.g., for decimation by a factor of two, P2 may be the power in the upper half of the C' virtual subcarrier values).

Symbols output by the symbol mapper circuit may be N-QAM symbols, N being an integer. An input of the symbol mapper circuit may be a forward error correction encoded bitstream. The circuitry may comprise one or both of: an inter-symbol correlation (ISC) generation circuit and a decimator circuit. While the circuitry operates in the first of the modes, symbols output by the symbol mapper circuit may be processed by the one or both of an ISC generation circuit and a decimator circuit. While the circuitry operates in the second of the modes, symbols output by the symbol mapper circuit may bypass the one or both of an ISC generation circuit and a decimator circuit. The ISC generation circuit may be a cyclic filter circuit. The circuitry may comprise an inverse fast Fourier transform (IFFT) circuit and one or both of: an inter-symbol correlation (ISC) generation circuit and a decimator circuit. While the circuitry operates in the first of the modes, symbols output by the symbol mapper circuit may be converted to physical subcarrier values by the one or both of an inter-symbol correlation (ISC) generation circuit and a decimator circuit prior to being input to the IFFT circuit. While the circuitry operates in the second of the modes, symbols output by the symbol mapper circuit may be input to the IFFT circuit without first being converted to physical subcarrier values. The circuitry may comprise a filtering and/or decimation circuit and an inverse fast Fourier transform (IFFT) circuit.

While the circuitry operates in a first of the modes the number of symbols (e.g., C') output by the symbol mapper circuit may be equal to a first number, the filtering and/or decimation circuit may multiply the first number of symbols by a matrix to generate a second number (e.g., C) of physical subcarrier values. A first dimension of the matrix may be smaller than or equal to the first number and a second dimension of the matrix may be equal to the first number. The second number of physical subcarrier values may be transformed to the first-mode OFDM symbol by the IFFT circuit. While the circuitry operates in a second of the modes, the number of symbols output by the mapper circuit may be equal to the second number, and the second number of symbols may be transformed to the second-mode OFDM symbol by the IFFT circuit.

The circuitry may comprise an inter-symbol correlation (ISC) generation circuit. While the circuitry operates in the first of the modes, the inter-symbol correlation (ISC) generation circuit performs a cyclic convolution on symbols output by the symbol mapper circuit. While the circuitry operates in the first of the modes, each of the data-carrying subcarriers used to transmit the first-mode OFDM symbol may have a particular bandwidth. While the circuitry operates in the second of the modes, each of the data-carrying subcarriers used to transmit the second-mode OFDM symbol may have the particular bandwidth. The circuitry may be configurable between the first and the second of the modes during operation based on feedback from a receiving device, channel or other communication conditions, a network controller, an application layer of the transmitter, and/or user input. At least a portion of the circuitry used while the transmitter operates in the first of the modes may be reused while the transmitter operates in the second of the modes. A first portion of the circuitry may be powered off while operating in the first of the modes, and a second portion of the circuitry may be powered off while the circuitry is operating in the second of the modes. A limit on an amount of non-linear distortion introduced to the first-mode OFDM symbol by the transmitter may be lower than a limit on an amount of non-linear distortion introduced to the second-mode OFDM symbol by the transmitter. The circuitry may be configurable to switch between the first of the modes and the second of the modes on a frame-by-frame basis.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A transmitter comprising:
    circuitry comprising a symbol mapper circuit and being operable in at least two modes, wherein:
    while said circuitry operates in a first of said modes, the number of symbols output by said symbol mapper circuit for a first-mode orthogonal frequency division multiplexing (OFDM) symbol transmitted by said transmitter is greater than the number of data-carrying subcarriers used to transmit said first-mode OFDM symbol;
    while said circuitry operates in a second of said modes, the number of symbols output by said symbol mapper circuit for a second-mode orthogonal frequency division multiplexing (OFDM) symbol transmitted by said transmitter is less than or equal to the number of data-carrying subcarriers used to transmit said second-mode OFDM symbol;
    said transmitter comprises a decimator and is operable to generate said first-mode OFDM symbol via a decimation performed by said decimator;
    said decimation introduces an amount of aliasing such that the ratio of P1 to P2 is equal to or less than a threshold signal-to-noise ratio of a receiver to which said OFDM subcarriers are transmitted;
    P1 is total signal power of C' virtual subcarrier values prior to said decimating; and
    P2 is the signal power of a portion of said C' virtual subcarrier values residing at a frequency above a folding frequency determined by a decimation factor.

2. The transmitter of claim 1, wherein said first-mode OFDM symbol and said second mode OFDM symbol are transmitted via a channel having an amount of nonlinearity that degrades a reception performance metric of said first-mode OFDM symbol by less than 1 dB, and that degrades the reception performance metric of said second-mode OFDM symbol by 1 dB or more.

3. The transmitter of claim 1, wherein symbols output by said symbol mapper circuit are N-QAM symbols, N being an integer.

4. The transmitter of claim 1, wherein an input of said symbol mapper circuit is a forward error correction encoded bitstream.

5. The transmitter of claim 1, wherein said circuitry comprises: an inter-symbol correlation (ISC) generation circuit and said decimator circuit, wherein:
    while said circuitry operates in said first of said modes, symbols output by said symbol mapper circuit are processed by said ISC generation circuit and said decimator circuit; and while said circuitry operates in said second of said modes, symbols output by said symbol mapper circuit bypass said one or both of said ISC generation circuit and said decimator circuit.

6. The transmitter of claim 5, wherein the ISC generation circuit is a cyclic filter circuit.

7. A transmitter comprising:
circuitry comprising a symbol mapper circuit, an inverse fast Fourier transform (IFFT) circuit, an inter-symbol correlation (ISC) generation circuit, and a decimator circuit, said circuitry being operable in a least two modes, wherein:
while said circuitry operates in a first of said modes, the number of symbols output by said symbol mapper circuit for a first-mode orthogonal frequency division multiplexing (OFDM) symbol transmitted by said transmitter is greater than the number of data-carrying subcarriers used to transmit said first-mode OFDM symbol;
while said circuitry operates in a second of said modes, the number of symbols output by said symbol mapper circuit for a second-mode orthogonal frequency division multiplexing (OFDM) symbol transmitted by said transmitter is less than or equal to the number of data-carrying subcarriers used to transmit said second-mode OFDM symbol;
while said circuitry operates in said first of said modes, symbols output by said symbol mapper circuit are converted to physical subcarrier values by said inter-symbol correlation (ISC) generation circuit and said decimator circuit prior to being input to said IFFT circuit; and
while said circuitry operates in said second of said modes, symbols output by said symbol mapper circuit are input to said IFFT circuit without first being converted to physical subcarrier values.

8. The transmitter of claim 1, wherein said circuitry comprises a filtering circuit and an inverse fast Fourier transform (IFFT) circuit, wherein:
while said circuitry operates in said first of said modes:
said number of symbols output by said symbol mapper circuit is equal to a first number;
said filtering circuit multiplies said first number of symbols by a matrix to generate a second number of physical subcarrier values, wherein a first dimension of said matrix is smaller than or equal to said first number and a second dimension of said matrix is equal to said first number; and
said second number of physical subcarrier values are transformed to said first-mode OFDM symbol by said IFFT circuit; and
while said circuitry operates in a second of said modes:
said number of symbols output by said symbol mapper circuit is equal to said second number; and
said second number of symbols are transformed to said second-mode OFDM symbol by said IFFT circuit.

9. The transmitter of claim 1, wherein said circuitry comprises an inter-symbol correlation (ISC) generation circuit, wherein:
while said circuitry operates in said first of said modes, said inter-symbol correlation (ISC) generation circuit performs a cyclic convolution on symbols output by said symbol mapper circuit.

10. The transmitter of claim 1, wherein:
while said circuitry operates in said first of said modes, each of said data-carrying subcarriers used to transmit said first-mode OFDM symbol has a particular bandwidth; and
while said circuitry operates in said second of said modes, each of said data-carrying subcarriers used to transmit said second-mode OFDM symbol has said particular bandwidth.

11. The transmitter of claim 1, wherein said circuitry is configurable between said first and said second of said modes during operation based on feedback from a receiving device, channel or other communication conditions, a network controller, an application layer of said transmitter, and/or user input.

12. The transmitter of claim 1, wherein at least a portion of said circuitry used while said transmitter operates in said first of said modes is reused while said transmitter operates in said second of said modes.

13. The transmitter of claim 1, wherein:
a first portion of said circuitry is powered off while operating in said first of said modes; and
a second portion of said circuitry is powered off while operating in said second of said modes.

14. The transmitter of claim 1, wherein:
said transmitter comprises a non-linear circuit that introduces non-linear distortion to symbols transmitted by said transmitter; and
said transmitter is operable to control a limit on an amount of non-linear distortion introduced by said non-linear circuit such that said limit is set to a first, lower value for said first-mode OFDM symbol and is set to a second, higher value for said second-mode OFDM symbol.

15. The transmitter of claim 1, wherein said circuitry is configurable to switch between said first of said modes and said second of said modes on a frame-by-frame basis.

16. The transmitter of claim 7, wherein said first-mode OFDM symbol and said second mode OFDM symbol are transmitted via a channel having an amount of nonlinearity that degrades a reception performance metric of said first-mode OFDM symbol by less than 1 dB, and that degrades the reception performance metric of said second-mode OFDM symbol by 1 dB or more.

17. The transmitter of claim 7, wherein symbols output by said symbol mapper circuit are N-QAM symbols, N being an integer.

18. The transmitter of claim 7, wherein an input of said symbol mapper circuit is a forward error correction encoded bitstream.

19. The transmitter of claim 7, wherein:
while said circuitry operates in said first of said modes, symbols output by said symbol mapper circuit are processed by said ISC generation circuit and said decimator circuit; and
while said circuitry operates in said second of said modes, symbols output by said symbol mapper circuit bypass said one or both of said ISC generation circuit and said decimator circuit.

20. The transmitter of claim 19, wherein the ISC generation circuit is a cyclic filter circuit.

21. The transmitter of claim 7, wherein:
said circuitry comprises a filtering circuit;
while said circuitry operates in said first of said modes:
said number of symbols output by said symbol mapper circuit is equal to a first number;
said filtering and/or decimation circuit multiplies said first number of symbols by a matrix to generate a second number of physical subcarrier values, wherein a first dimension of said matrix is smaller than or equal to said first number and a second dimension of said matrix is equal to said first number; and said second number of physical subcarrier values are transformed to said first-mode OFDM symbol by said IFFT circuit; and while said circuitry operates in said second of said modes:
said number of symbols output by said symbol mapper circuit is equal to said second number; and
said second number of symbols are transformed to said second-mode OFDM symbol by said IFFT circuit.

22. The transmitter of claim 7, wherein:
while said circuitry operates in said first of said modes, said inter-symbol correlation (ISC) generation circuit performs a cyclic convolution on symbols output by said symbol mapper circuit.

23. The transmitter of claim 7, wherein:
while said circuitry operates in said first of said modes, each of said data-carrying subcarriers used to transmit said first-mode OFDM symbol has a particular bandwidth; and
while said circuitry operates in said second of said modes, each of said data-carrying subcarriers used to transmit said second-mode OFDM symbol has said particular bandwidth.

24. The transmitter of claim 7, wherein said circuitry is configurable between said first and said second of said modes during operation based on feedback from a receiving device, channel or other communication conditions, a network controller, an application layer of said transmitter, and/or user input.

25. The transmitter of claim 7, wherein at least a portion of said circuitry used while said transmitter operates in said first of said modes is reused while said transmitter operates in said second of said modes.

26. The transmitter of claim 7, wherein:
a first portion of said circuitry is powered off while operating in said first of said modes; and
a second portion of said circuitry is powered off while operating in said second of said modes.

27. The transmitter of claim 7, wherein:
said transmitter comprises a non-linear circuit that introduces non-linear distortion to symbols transmitted by said transmitter; and
said transmitter is operable to control a limit on an amount of non-linear distortion introduced by said non-linear circuit such that said limit is set to a first, lower value for said first-mode OFDM symbol and is set to a second, higher value for said second-mode OFDM symbol.

28. The transmitter of claim 7, wherein said circuitry is configurable to switch between said first of said modes and said second of said modes on a frame-by-frame basis.

* * * * *